(12) United States Patent
Tsuyama et al.

(10) Patent No.: US 7,562,141 B2
(45) Date of Patent: Jul. 14, 2009

(54) USING AN INFORMATION IMAGE TO PERFORM A PREDETERMINED ACTION

(75) Inventors: Fumio Tsuyama, Kanagawa (JP); Noriyuki Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 10/478,332

(22) PCT Filed: Mar. 24, 2003

(86) PCT No.: PCT/JP03/03531

§ 371 (c)(1), (2), (4) Date: Nov. 21, 2003

(87) PCT Pub. No.: WO03/081438

PCT Pub. Date: Oct. 2, 2003

(65) Prior Publication Data

US 2005/0034054 A1     Feb. 10, 2005

(30) Foreign Application Priority Data

Mar. 25, 2002   (JP)   ............................. 2002-084424

(51) Int. Cl.
- G06F 15/16     (2006.01)
- G06F 17/30     (2006.01)
- G06F 11/00     (2006.01)

(52) U.S. Cl. .................. 709/225; 709/217; 709/229; 726/26; 726/28; 726/29; 726/32

(58) Field of Classification Search ............ 709/225, 709/229, 217; 726/28, 29, 31

See application file for complete search history.

(56) References Cited

U.S. PATENT DOCUMENTS 5,598,524 A * 1/1997 Johnston et al. ............. 715/769

(Continued)

FOREIGN PATENT DOCUMENTS

| JP | 10-188390 | 7/1998 |
| JP | 11-259393 | 9/1999 |
| JP | 2000-253042 | 9/2000 |
| JP | 2001-092575 | 4/2001 |

(Continued)

*Primary Examiner*—Kevin Bates
(74) *Attorney, Agent, or Firm*—Finnegan, Henderson, Farabow, Garrett & Dunner, L.L.P.

(57) ABSTRACT

An information image utilization system and so forth by which it is possible to particularly set the access right and so forth relating to utilization of an apparatus information image and utilization of an apparatus through the apparatus information image to perform authentication. A client (108) issues a request for provision of ownership information of an apparatus information image (indicating an apparatus possessed by a user of the client (108)) to an information image management server (104). The information image management server (104) extracts user IDs of owners of the apparatus information image and attribute information of copy information image data corresponding to the owners from an apparatus information image management table, and transmits the user IDs and the attribute information to the client (108). On the other hand, if an instruction to change the attribute information or to delete the copy information image or the like is transmitted from the client (108), then the information image management server (104) updates contents of the apparatus information image management table and updates contents of a folder management table.

20 Claims, 19 Drawing Sheets

U.S. PATENT DOCUMENTS

| | | | |
|---|---|---|---|
| 5,724,578 A * | 3/1998 | Morinaga et al. | 707/100 |
| 5,999,766 A * | 12/1999 | Hisatomi et al. | 399/80 |
| 6,049,799 A | 4/2000 | Mangat et al. | |
| 6,496,206 B1 * | 12/2002 | Mernyk et al. | 715/835 |
| 6,728,878 B2 * | 4/2004 | Dillon | 713/160 |
| 6,816,904 B1 * | 11/2004 | Ludwig et al. | 709/226 |
| 6,882,979 B1 | 4/2005 | Reay et al. | |
| 6,892,201 B2 * | 5/2005 | Brown et al. | 707/9 |
| 6,895,503 B2 * | 5/2005 | Tadayon et al. | 713/168 |
| 6,944,776 B1 * | 9/2005 | Lockhart et al. | 713/176 |
| 7,068,309 B2 * | 6/2006 | Toyama et al. | 348/231.5 |
| 7,096,203 B2 * | 8/2006 | Pence et al. | 705/59 |
| 7,110,982 B2 * | 9/2006 | Feldman et al. | 705/51 |
| 7,149,750 B2 * | 12/2006 | Chadwick | 707/103 R |
| 7,269,577 B2 * | 9/2007 | Stefik et al. | 713/167 |
| 7,360,098 B2 * | 4/2008 | Johnson et al. | 713/189 |
| 7,415,439 B2 * | 8/2008 | Kontio et al. | 709/217 |

FOREIGN PATENT DOCUMENTS

| | | |
|---|---|---|
| JP | 2001-142825 | 5/2001 |
| JP | 2001-216713 | 8/2001 |
| JP | 2001-337884 | 12/2001 |
| JP | 2002-041392 | 2/2002 |
| JP | 2002-41392 | 2/2002 |
| JP | 2002-51322 | 2/2002 |
| JP | 2002-63467 | 2/2002 |
| JP | 2002-063467 | 2/2002 |
| JP | 2002-163167 | 6/2002 |
| JP | 2003-284030 | 10/2003 |
| JP | 3622913 | 12/2004 |

\* cited by examiner

FIG. 2

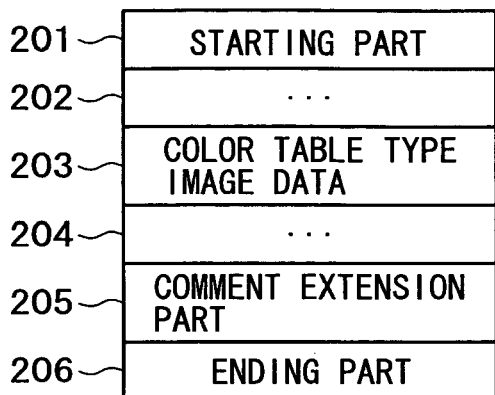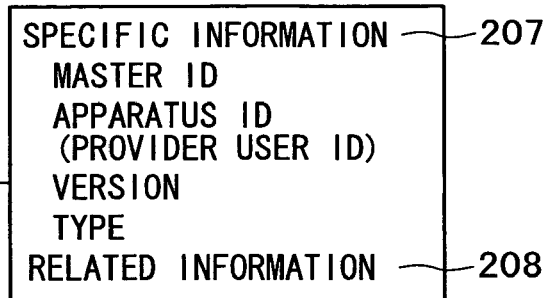

- 200
- 201 STARTING PART
- 202 ...
- 203 COLOR TABLE TYPE IMAGE DATA
- 204 ...
- 205 COMMENT EXTENSION PART
- 206 ENDING PART

- 207 SPECIFIC INFORMATION
  - MASTER ID
  - APPARATUS ID (PROVIDER USER ID)
  - VERSION
  - TYPE
- 208 RELATED INFORMATION

FIG. 3

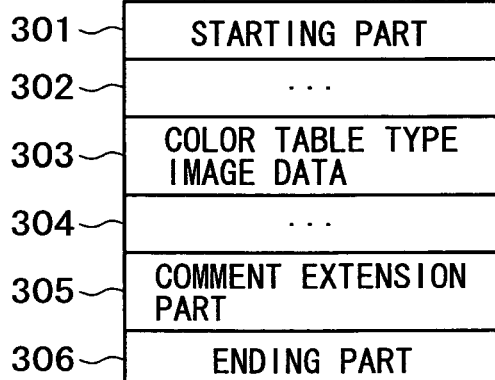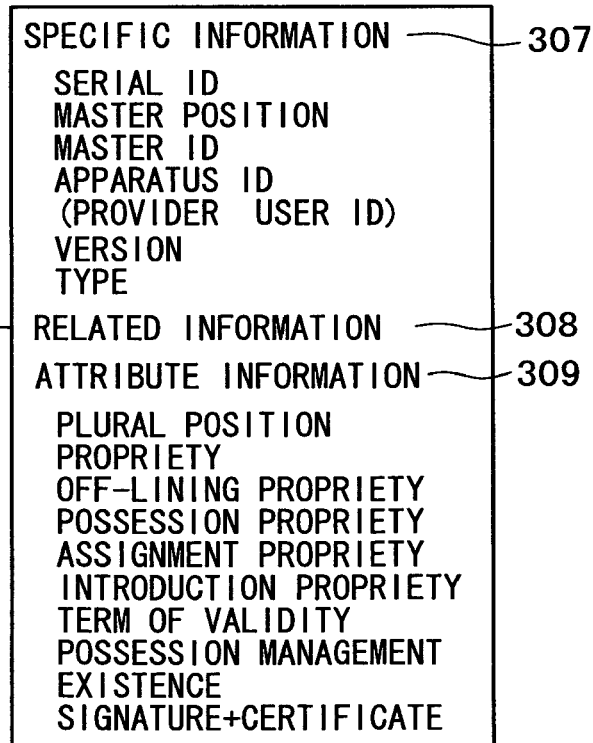

- 300
- 301 STARTING PART
- 302 ...
- 303 COLOR TABLE TYPE IMAGE DATA
- 304 ...
- 305 COMMENT EXTENSION PART
- 306 ENDING PART

- 307 SPECIFIC INFORMATION
  - SERIAL ID
  - MASTER POSITION
  - MASTER ID
  - APPARATUS ID (PROVIDER USER ID)
  - VERSION
  - TYPE
- 308 RELATED INFORMATION
- 309 ATTRIBUTE INFORMATION
  - PLURAL POSITION PROPRIETY
  - OFF-LINING PROPRIETY
  - POSSESSION PROPRIETY
  - ASSIGNMENT PROPRIETY
  - INTRODUCTION PROPRIETY
  - TERM OF VALIDITY
  - POSSESSION MANAGEMENT EXISTENCE
  - SIGNATURE+CERTIFICATE

FIG. 6

```
<icon
       title="CLIP-ON OF THE LIVING ROOM"
601─  icon_id="fuon://fuon.ccc.com/device:2002-02-12-1234"
602─  version="1"
603─  category="device icon"
604─  own="single"
605─  offline="disable"
606─  recommend="enable">
       ...
```

```
<action event="D&D">
    <property sequence="1" id="2"/>
</action>
       ...
<property
       property_id="1"
       visible="true"
       title="TABLE OF CONTENTS"
   <reference
       content_type="fuon/icon-list"
       location="fuon://fuon.ccc.com/device:200202?method=get_list"
   />
</property>
```
607   608

```
<property
       property_id="3"
       visible="true"
       title="RECORDING RESERVATION"
   <reference
       content_type="fuon/device-control"
       location="fuon://fuon.ccc.com/device:200202?me ··· "
   />
</property>
```
       ...
```
</icon>
```

| USER ID | PASSWORD | USER ATTRIBUTE | APPARATUS MANAGEMENT SERVER POSITION | FOLDER MANAGEMENT SERVER POSITION |
|---|---|---|---|---|
| U01 | xxxxx | YAMAMOTO | 155.11.11.01 | 155.77.11.01 |
| U02 | yyyyy | KATOH | 155.11.22.01 | 155.77.22.01 |

| APPARATUS ID | STATUS |
|---|---|
| D99 | ACTIVATED |
| D88 | NOT ACTIVATED |

802 803

F I G. 1 2
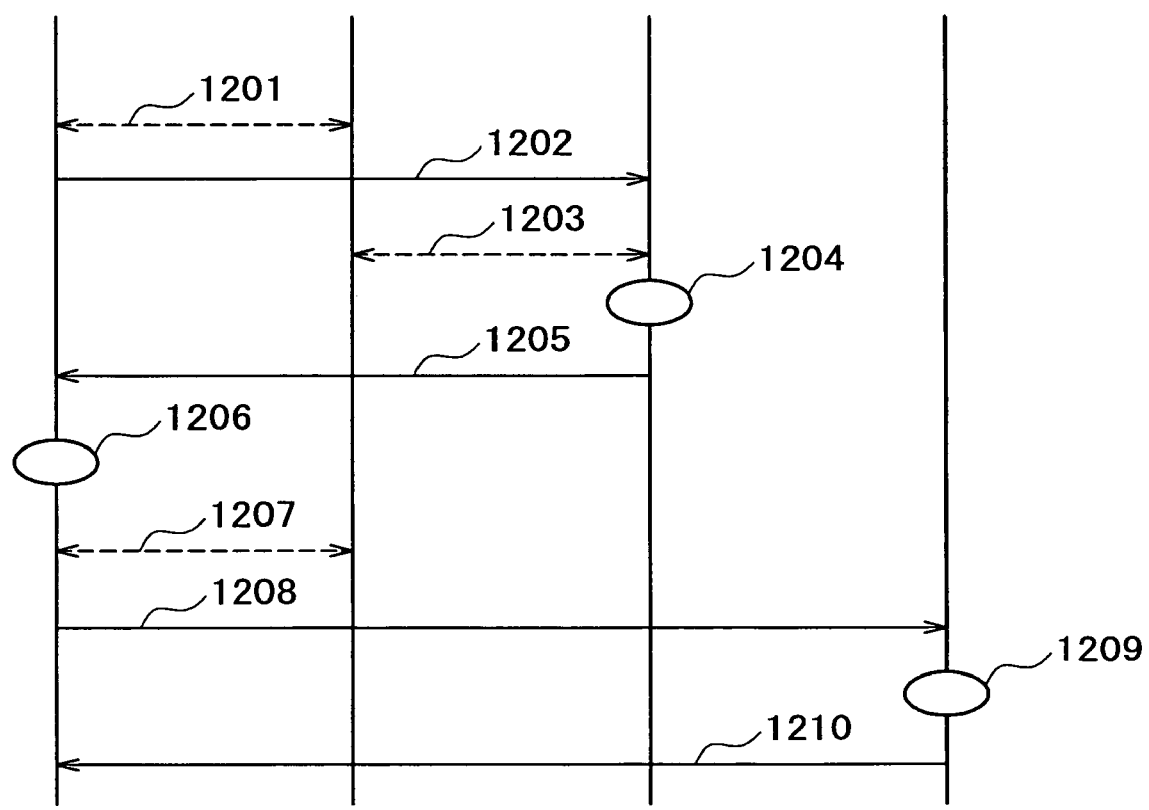

108
(USER ID "U01")

FIG. 21
108-2
(USER ID "U02")
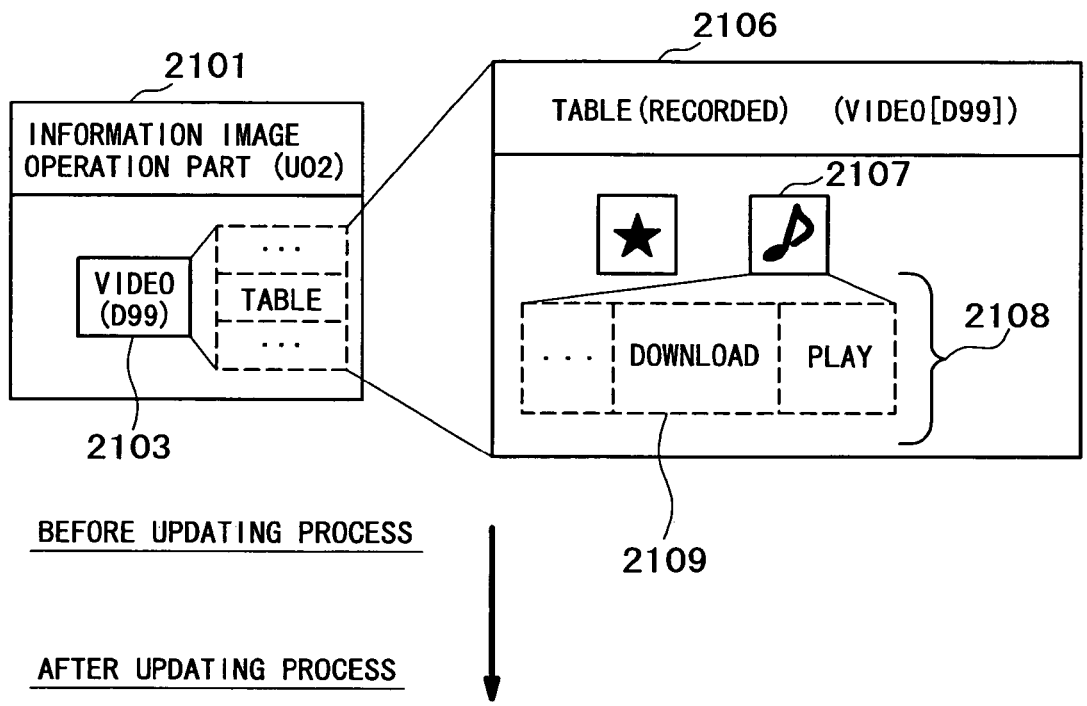
BEFORE UPDATING PROCESS
AFTER UPDATING PROCESS
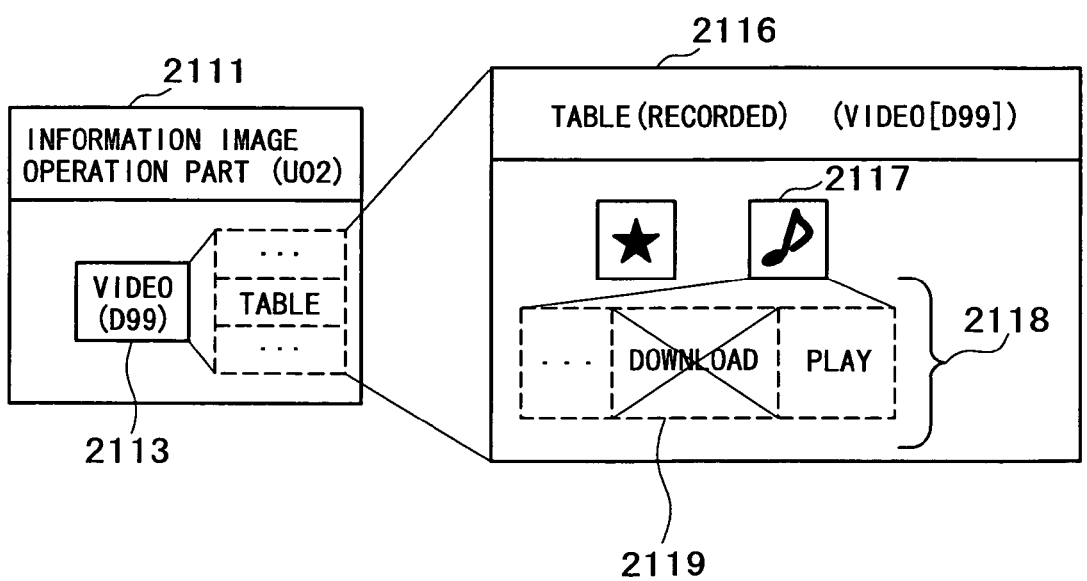

USING AN INFORMATION IMAGE TO PERFORM A PREDETERMINED ACTION

TECHNICAL FIELD

This invention relates to information operation performed between different information processing apparatus such as computers connected to each other through a network such as the Internet. More particularly, the present invention relates to an information image utilization system and so forth which use an "information image wherein image information, related information which causes an operator to perform a predetermined action based on the image information, attribute information which defines handling of information relating to the image information and other information are handled as a handling unit.

BACKGROUND ART

In recent years, it has become a daily matter for a general user to connect a computer to a network and acquire various kinds of information through the network or to perform communication between computers through a network in order to deliver information. Various interfaces have been proposed in order to achieve transmission and reception of information through a network or achieve smooth and easy communication between computers. For example, also a bookmark function of a browser and a communication destination retaining function (address book) of communication software can be considered as interfaces for efficiently performing acquisition of information, transmission and reception of information and communication through a network.

Further, as a method for more efficient acquisition of information and communication on the Internet, a method has been proposed which uses an "information image" with which image information and related information which causes a predetermined action to be performed based on the image information are processed as one handling unit. The information image can be managed readily because an image file and a plurality of pieces of related information are managed as one handling unit.

As regards an operation and so forth of an apparatus with an information image through a network, Japanese Patent Laid-Open No. 2001-92575 discloses that icons corresponding to a plurality of connected apparatus are displayed as a GUI relating to connection of the apparatus on a monitor and a display form of the icons is changed to display a connection state of the apparatus.

Japanese Patent Laid-Open No. 2001-216713 discloses that a connection state of a connected apparatus is displayed in the form of an icon on a computer to which the operation apparatus is connected and operations of an operation apparatus are displayed each in the form of an icon (a recording icon, a reproduction icon, a recording reservation icon and so forth) so that an operator can perform setting and so forth by a simple operation.

Japanese Patent Laid-Open No. Hei 10-188390 discloses that a program icon is dragged to and dropped into a time zone display portion of a recording apparatus in order that recording reservation can be performed readily.

Further, regarding the access right to information, Japanese Patent Laid-Open No. 2000-253042 discloses an information access right management system wherein a database for managing the access right to information relating to an electronic name card is provided and a person who prepared the electronic name card sets the access right to laid-open information.

However, as regards such limitation to utilization of an information image, where a link destination or a communication destination of an information image limits the access period or limits information provision contents, there is a problem that it is difficult to set, in an information image (apparatus information image) which specifies the position of an apparatus and is used for operation of the apparatus, acquisition of information from the apparatus and so forth, the access right, utilization limitation and so forth regarding utilization and so forth of the apparatus information image and the pertaining apparatus to perform authentication.

Meanwhile, duplication and so forth of an information image are generally free, and duplicates are same as each other. Accordingly, acquiring persons of such duplicates cannot be identified from one another, and they can receive the benefit relating to the information image similarly to an owner of the original information image. In other words, there is a problem that it is difficult to grasp a real owner of an information image and it is difficult to set the access right, utilization limitation and so forth for each owner of an information image.

Further, where an information image has a plurality of utilization items (predetermined actions), there is a problem that it is difficult to set the access right, utilization limitation and so forth for each utilization item (predetermined action).

Furthermore, there is a problem that it is difficult to change the set access right, utilization limitation and so forth at an arbitrary point of time after provision or the like of an information image.

A countermeasure for allowing an information image providing side to limit and manage, for each of users, such an act as, for example, to send e-mail to which an information image owned by a user is annexed to a friend or the like or to record such an information image onto a flexible disk and carry out the flexible disk has not been available. Further, it has been impossible to change the period of utilization of an information image provided once to a user after the information image is provided or to change the owner limitation (for example, such change that, although it was prescribed when the information image was provided that the information image cannot be assigned to another person, such assignment is permitted after lapse of a certain period of time). Further, a countermeasure for an information image providing person to stop utilization of the information image only by a particular user has not been available. It is particularly difficult to grasp that a user or the like who has acquired an information image by duplication or the like owns the information image, and it is very difficult to take such a countermeasure as to stop utilization or the like because of a retroactive reason.

In the above-described Japanese Patent Laid-Open No. 2001-92575, interconnection of different apparatus is carried out by use of an icon, but there is no description about authentication by setting or the like of the access right.

Meanwhile, according to the above-described Japanese Patent Laid-Open No. 2001-216713, an icon merely indicates an operation apparatus or an operation but does not include information of the access right or the like. Further, there is no description about a function regarding connection limitation from an icon to an apparatus or the like and also of authentication.

Further, in the above-described Japanese Patent Laid-Open No. Hei 10-188390, a function relating to use limitation to a program icon or relating to authentication is not mentioned.

The information access right management system disclosed in the above-described Japanese Patent Laid-Open No. 2000-253042 includes a database for managing the access right to information relating to an electronic name card. However, the electronic name card principally has only a limited function to disclosure of information relating to the electronic name card (information reference function). However, the document is quite silent of transmission and reception of information and so forth through the electronic name card. Further, as regards acquisition of an electronic name card, the document discloses only a method of individually acquiring an electronic name card from an electronic name card creator. Thus, the information access right management system lacks in flexibility in terms of promotion of provision of information and promotion of expansion of a network.

The present invention has been made in view of such problems as described above, and it is an object of the present invention to provide an information image utilization system and so forth by which it is possible to set, in an information image (apparatus information image) which specifies the position of an apparatus and is used for operation of the apparatus, acquisition of information from the apparatus through a network and so forth, the access right, utilization limitation and so forth regarding operation of the apparatus, acquisition of information and so forth through the apparatus information image to authenticate.

DISCLOSURE OF THE INVENTION

In order to attain the object described above, according to a first aspect of the present invention, there is provided an information image utilization system which includes one or a plurality of information image management servers, one or a plurality of folder management servers, a user management server and one or a plurality of clients connected to one another through a network and wherein any of the clients accesses an apparatus which includes one of the information image management servers through an information image which is handled in a handling unit including image information and related information which causes a predetermined action to be performed based on the image information, characterized in (a) that the one information image management server or each of the plurality of information image management servers includes an apparatus information image management section for producing and storing a first apparatus information image such that specific information including an identifier of the apparatus is contained in the information image, producing and storing a second apparatus information image such that attribute information representative of access right for each of identifiers of the clients which are owners and for each of the predetermined actions is contained in the first apparatus information image, and storing an apparatus information image management table for coordinating identifies of the first apparatus information images, identifiers of the second apparatus information images and identifiers of the clients with one another, and a contents information image management section for acquiring contents in accordance with an instruction of any of the clients which accesses through the apparatus information image and producing and storing a contents information image which contains specific information which includes an identifier of the contents, (b) that the one folder management server or each of the plurality of folder management server stores a folder management table which coordinates the identifiers of the clients and the identifiers of the apparatus information images owned by the clients with each other, (c) that the user management server authenticates of the clients and stores a user management table which coordinates the identifiers of the clients and the folder management servers with each other, and (d) that the one client or each of the plurality of clients communicates with any of the folder management servers, displays the apparatus information image owned by the client and performs the predetermined action based on the related information and the attribute information contained in the apparatus information image.

According to the first aspect of the present invention, the one information image management server or each of the plurality of information image management servers produces and stores a first apparatus information image such that specific information including an identifier (apparatus ID) of the apparatus is contained in the information image. The one or each information image management server further produces and stores a second apparatus information image such that attribute information representative of access right for each of identifiers (owner user ID) of the clients which are owners and for each of the predetermined actions is contained in the first apparatus information image. Furthermore, the one or each information image management server stores an apparatus information image management table which coordinates identifies (master ID) of the first apparatus information images, identifiers (serial ID) of the second apparatus information images and identifiers (owner user ID) of the clients with one another.

Further, the one or each information image management server acquires contents in accordance with an instruction of any of the clients which accesses through the apparatus information image and produces and stores a contents information image which contains specific information which includes an identifier (contents ID) of the contents.

Meanwhile, the one folder management server or each of the plurality of folder management server stores a folder management table which coordinates the identifiers (user ID) of the clients and the identifiers (master ID or serial ID) of the apparatus information images owned by the clients with each other.

Further, the user management server performs authentication of the clients and stores a user management table which coordinates the identifiers (user ID) of the clients and the folder management servers with each other.

The one client or each of the plurality of clients communicates with any of the folder management servers, displays the apparatus information image owned by the client and performs the predetermined action based on the related information and the attribute information contained in the apparatus information image.

When the owner of the second apparatus information image is changed (if contents of the folder management table are changed), the information image management server causes the change to reflect on the apparatus information image management table. Then, the information image management server extracts the identifier of the client that owns the second apparatus information image based on the apparatus information image management table. Accordingly, the information image management server can normally grasp the owner of the second apparatus information image.

An instruction to extract an owner may be inputted directly to the apparatus (information image management server) or may be issued from one of the clients through the network by an owner of the apparatus (a manager or the like of the apparatus). In the former case, the information image management server may display a result of the extraction on a display section of the apparatus or the like. In the latter case, the information image management server transmits a result of the extraction to the pertaining client.

On the other hand, when an instruction to change the attribute information contained in the second apparatus information image or to delete the second apparatus information image is received, the information image management server updates the apparatus information image management table in accordance with the instruction.

The information image management server transmits the updated contents of the apparatus information image management table to the folder management servers. Each of the folder management servers thus updates the folder management table based on the updating contents transmitted thereto.

Accordingly, the information image management server can perform change of the attribute information contained in the second apparatus information image or deletion or the like of the second apparatus information image by updating the contents of the apparatus information image management table.

An instruction for such change of the attribute information contained in the second apparatus information image or for deletion or the like of the second apparatus information image may be inputted directly to the apparatus (information image management server) or may be issued from one of the clients through the network by the owner of the apparatus (manager or the like of the apparatus).

The "apparatus" may be any of computers, information portable terminals, portable telephone sets, electric appliances, various apparatus and so forth and has the information image management server described above. The apparatus may further have the function of a client.

The "network" can bidirectionally distribute information data formatted in accordance with a predetermined protocol as represented by the Internet. Further, the network may be a wireless network or a wire network.

The "information image" includes, as one handling unit, image information, related information which causes an operator to perform a predetermined action based on the image information, and other information and allows a work such as transmission on a network to be realized by a single handling process. It is to be noted such information images are divided into a "master information image" and a "copy information image. The "first image information" corresponds to the "master information image", and the "second information image" corresponds to the "copy information image". The information image may be formed from electronic data described in a markup language such as the XML (EXTENSIBLE MARKUP LANGUAGE) data.

The "master information image" is an information image managed by an apparatus (information image management server), and change or the like of the contents of the "master information image" is normally performed by an owner of the apparatus (information image management server) (a manager of the apparatus, an information image providing person or the like). The master information image has specific information (a master ID, an apparatus ID, a providing person user ID, a version, a type and so forth) for specifying the master information image.

The "copy information image" is produced based on the master information image. The copy information image has, similarly to the master information image, specific information (a serial ID, a version, a type, a master ID, a master position, an apparatus ID, a providing person user ID and so forth) for specifying the copy information image. When the copy information image is produced based on the master information image, attribute information and other necessary information are added to the copy information image. Then, when the copy information image is owned by an operator of a client, attribute information and other necessary information are set for the individual client. Accordingly, even where different copy information images are produced based on the same master information image, they may be provided with functions different among different clients.

The "image information" can be specified based on image specific information such as identification information embedded, for example, in a file name or in the image information, and acts so as to be displayed as an image on an information display apparatus which is a client. More specifically, the image information is a data stream regarding an image for which various formats such as the GIF format, JPG format and PCX format can be used.

The "related information" is basic information used when an operator of a terminal wants to cause the terminal to perform a "predetermined action" using the information image as a clue. In other words, the related information is information relating to the information image or the image information.

The "predetermined action" is handling of the apparatus and contents the apparatus has, and may be, for example, an operation of the apparatus (such as recording reservation), acquisition of contents retained by the apparatus (downloading and so forth), reproduction of the contents (streaming reproduction and so forth), deletion of the contents and so forth. The processes mentioned are hereinafter described.

The "specific information" is information for specifying the information image. In the case of the master information image, the specific information may be a master ID unique in the information image utilization system, an apparatus ID, a providing person user ID, a version, a type of the information image and so forth. In the case of the copy information image, the specific information may be a serial ID unique in the information image utilization system, a version, a type of the information image, a master ID of the source of production, a location (master position) of the master information image, an apparatus ID, a providing person user ID and so forth.

It is to be noted that, in the case of an apparatus information image hereinafter described, the specific information may include an apparatus name, an apparatus ID, an IP (Internal Protocol) address of the apparatus, and so forth.

The "attribute information" defines handling of information relating to the copy information image. When the copy information image is owned by an operator of a client, attribute information and other necessary information are set for the individual client. It is otherwise possible to set the attribute information for each predetermined action. Also it is possible for the providing person of the information image (a user who possesses the apparatus or the like) to change the attribute information as an ex post facto process. The attribute information may be propriety of possession by a plurality of persons, propriety of offline processing, propriety of ownership, propriety of assignment, propriety of introduction (forwarding), the term of validity, whether or not the copy information image is under ownership management, a signature, a certificate and so forth.

The "client" is an information terminal apparatus, an information display apparatus or an apparatus merely called terminal and may include, for example, a personal computer, a portable information terminal, a portable telephone set or an electric appliance having an information terminal function. The client has a function which at least incorporates an incorporates information image processing element such that it can display and operate the information image.

The information image can play various roles relating to communication, transmission and reception of information and so forth by defining various utilization items (predetermined actions) in the related information contained in the information image. Particularly, an information image which contains specific information including an identifier of an apparatus (apparatus identifier) and mediates accessing from a client to the apparatus is called "apparatus information image".

A user of the information image utilization system can perform, at a place far away from the home, recording reservation for a video recorder at home (which corresponds to an apparatus which has the information image management server) from a PDA (Personal Digital Assistant) through the apparatus information image. The video recorder retains the recorded program and so forth as contents data and produces and stores an information image (contents information image) representative of the contents data. The user can utilize the contents information image together with the apparatus information image and can reproduce the contents data. For example, it is possible for the user at a place far away from the home to perform recording reservation for a video recorder at home using a PDA and reproduce the recorded program on a personal computer in a company.

Further, it is possible to set, to the attribute information contained in an information image, propriety of utilization (which corresponds to the access right) for each of utilization items (predetermined actions) defined in the related information. Further, such setting of propriety of utilization can be performed also for each owner of an information image.

The providing person (user who owns the apparatus or the like) of an apparatus information image can change the attribute information relating to an apparatus information image (copy information image) which indicates the apparatus but is owned by another user. Further, similarly as in the case of the apparatus information image, the attribute information relating to a contents information image (copy information image) representative of contents data in the apparatus can be changed. Consequently, if the apparatus information image is owned by an unintended person from duplication or some other reason, or if it is intended to limit utilization of the apparatus information image by a certain owner, then the providing person of the apparatus information image (the user who owns the apparatus or the like) can cope with this by changing the attribute information of the apparatus information image corresponding to the owner or deleting the apparatus information image corresponding to the owner. In other words, the providing person of the apparatus information image not only can limit utilization of the apparatus information image in advance, but can take an ex post facto countermeasure against an illegal operation of the apparatus, illegal acquisition of contents data in the apparatus and so forth through the apparatus information image. In other words, through the mediation of the apparatus information image, not only accessing from a client to the apparatus is allowed, but also authentication of the client can be performed. As a result, illegal accessing to apparatus and so forth can be prevented and information distribution with a high degree of safety can be achieved.

According to a second aspect of the present invention, there is provided one or a plurality of information image management servers connected to one or a plurality of clients through a network for managing information images wherein image information and related information which causes a predetermined action to be performed based on the image information are handled as a handling unit to mediate accessing from any of the clients to an apparatus which has one of the information image management servers, characterized in that the one information image management server or each of the plurality of information image management servers includes an apparatus information image management section for producing and storing a first apparatus information image such that specific information including an identifier of the apparatus is contained in the information image, producing and storing a second apparatus information image such that attribute information representative of access right for each of identifiers of the clients which are owners and for each of the predetermined actions is contained in the first apparatus information image, and storing an apparatus information image management table for coordinating identifies of the first apparatus information images, identifiers of the second apparatus information images and identifiers of the clients with one another.

The second aspect of the present invention is an invention directed to the information image management servers in the information image utilization system according to the first aspect of the present invention.

According to a third aspect of the present invention, there is provided an information image management method for an information image management server connected to one or a plurality of clients through a network for managing information images wherein image information and related information which causes a predetermined action to be performed based on the image information are handled as a handling unit to mediate accessing from any of the clients to an apparatus which has one of the information image management servers, characterized in that a first apparatus information image is produced and stored such that specific information including an identifier of the apparatus is contained in the information image, and a second apparatus information image is produced and stored such that attribute information representative of access right for each of identifiers of the clients which are owners and for each of the predetermined actions is contained in the first apparatus information image, and then an apparatus information image management table for coordinating identifies of the first apparatus information images, identifiers of the second apparatus information images and identifiers of the clients with one another is stored.

The third aspect of the present invention is an invention directed to an information image management method for the information image management server or servers according to the second aspect of the present invention.

According to a fourth aspect of the present invention, there is provided an apparatus information image, characterized in that image information, related information which causes a predetermined action to be performed based on the image information, specific information including an identifier of a client connected through a network, and attribute information including access right for each predetermined action and for each owner are handled as a handling unit to mediate accessing from the client to an apparatus which has an information image management server.

The fourth aspect of the present invention is an invention directed to the apparatus information image according to the first to third aspects of the present invention.

According to a fifth aspect of the present invention, there is provided a program which causes a computer to function as the information image management server according to the first aspect of the present invention.

According to a sixth aspect of the present invention, there is provided a recording medium on which a program which causes a computer to function as the information image management server according to the first aspect of the present invention.

The "recording medium" may be a CD-ROM, a DVD, a flexible disk, a hard disk or the like.

The configuration and characteristics of the present invention will become apparent from the embodiment described below and the accompanying drawings.

BRIEF DESCRIPTION OF THE DRAWINGS

FIG. 2 is a view illustrating master information image data 200;

FIG. 3 is a view illustrating copy information image data 300;

FIG. 6 is a view illustrating an example of a data configuration of an information image according to XML data;

FIG. 7 is a view illustrating an example of a configuration of a user management table 701 stored in and managed by a user management section 111 of a user management server 101;

FIG. 8 is a view illustrating an example of a configuration of an apparatus management table 801 stored in and managed by an apparatus management section 112 of an apparatus management server 102;

FIG. 12 is an information flow diagram illustrating action of the information image management server 104 (an apparatus information image management section 105), user management server 101, apparatus management server 102 and folder management server 107 upon apparatus registration and production of an apparatus information image;

FIG. 21 is a view showing an information image operation section displayed on a client before and after an updating process relating to an apparatus information image.

BEST MODE FOR CARRYING OUT THE INVENTION

Figure 1:
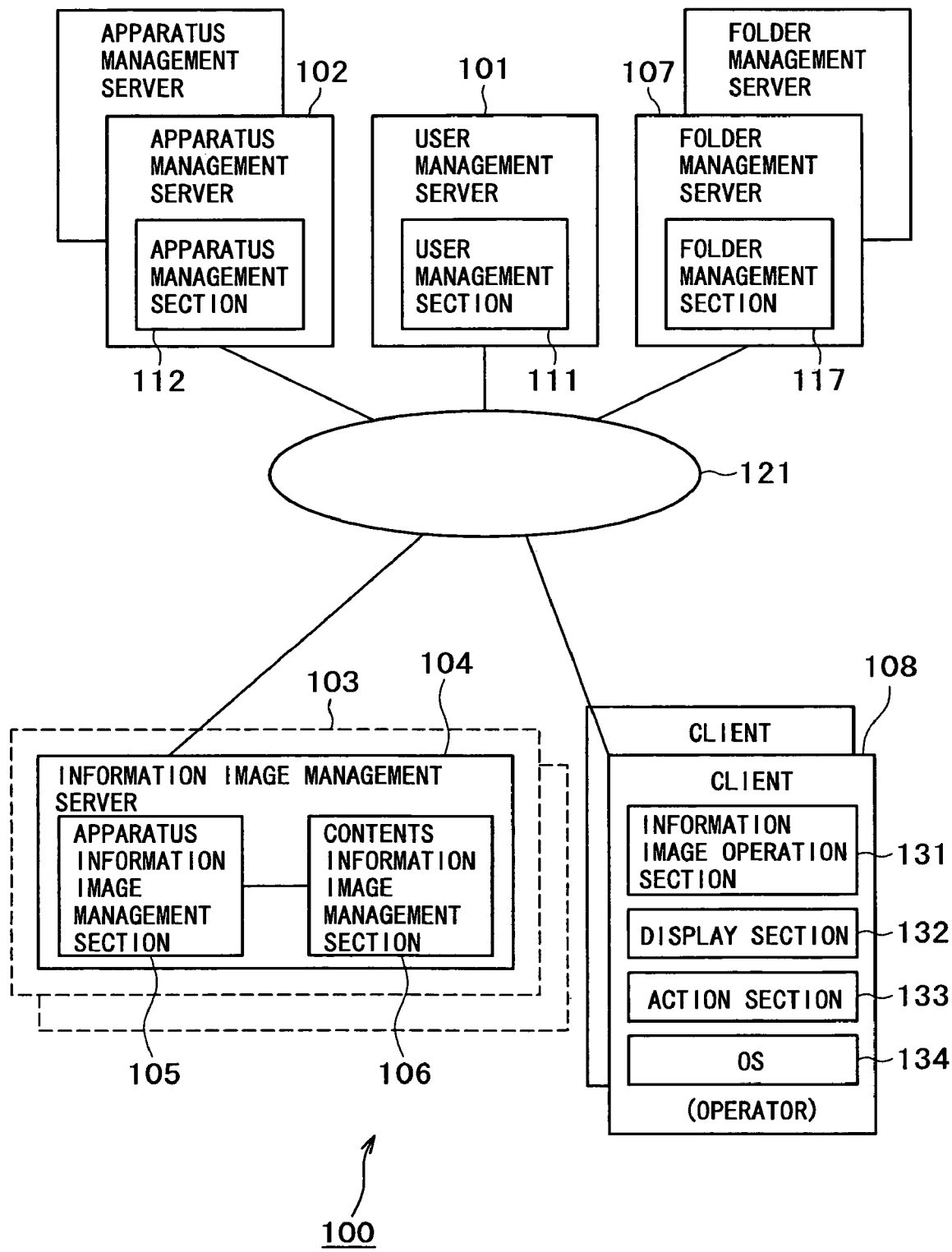
FIG. 1 is a block diagram of a general configuration of an information image utilization system 100.

In the following, a preferred embodiment of an information image utilization system and so forth according to the present invention is described in detail with reference to the accompanying drawings. It is to be noted that, in the following description and the accompanying drawings, components having substantially same functional configurations are denoted by like reference characters and overlapping description of them is omitted herein.

(1. System Configuration of the Information Image Utilization System)

First, a system configuration of an information image utilization system according to the present invention is described with reference to FIG. 1. FIG. 1 is a block diagram of a general configuration of an information image utilization system 100. As shown in FIG. 1, the information image utilization system 100 adopts a configuration wherein a user management server 101, apparatus management servers 102, information image management servers 104, folder management servers 107 and clients 108 are interconnected by a network 121 which allows bidirectional communication such as the Internet.

Information which is exchanged through the network 121 principally includes an information image, various kinds of information guided through the information image, and an information image processing apparatus (information image utilization supporting program and so forth) for allowing the information image to be utilized on the client side. The information further includes attribute information annexed to the information image, operation information of the information image for a client, and so forth. The information mentioned is hereinafter described in detail.

The user management server 101 is an information processing apparatus such as a computer and performs authentication of a user who utilizes the present information image utilization system. The user management server 101 includes a user management section 111. The user management section 111 stores and manages information regarding users. Further, in a certain embodiment, the user management server 101 has a function of cooperating with the apparatus management server 102 and the folder management server 107 to manage operation information of an information image to perform a predetermined accounting process.

It is to be noted that a "user" generally is a user of the information image utilization system 100 and the following description proceeds assuming that the "user" includes an information image provider ("provider") having the authority regarding an information image management server 104 (apparatus 103) and an operator ("operator") of a client 108. However, the "provider" or "operator" may sometimes be used in place of the "user" in order to facilitate understanding. However, an information image management server and a client can be formed do as to function as a unitary member. In other words, it is possible to form one apparatus or device (computer, information portable terminal, portable telephone set, electrical appliance, various devices and so forth) so as to function as an information image management server or act as a client. Therefore, although users are sometimes divided into-an operator and a provider in order to facilitate understandings, naturally one user may actually be an operator and a provider. Further, it is possible to understand a provider as an owner of an apparatus 103 having an information image management server 104 or the like.

Each of the apparatus management servers 102 is an information processing apparatus such as a computer, and issues an apparatus ID, which can be identifiable on the information image utilization system, to an apparatus and manages situations (an activated state and so forth) of apparatus included in the present information utilization system.

Each of the information image management servers 104 may be built in an apparatus 103. The apparatus may be a computer, an information portable terminal, a portable telephone set, an electrical appliance, or one of various apparatus. The information image management server 104 is a server apparatus such as a computer connected to terminals through a network and has a function of managing operation information of an information image and so forth in the clients. Further, the information image management server 104 has a function of synthesizing image information, specific information (a master ID, an apparatus ID, a provider user ID, a version, a type and so forth) and related information for causing an operator to perform a predetermined action based on the image information into a master information image which is a handling unit as hereinafter described.

Further, when the information image management server 104 produces a copy information image based on a master information image, it incorporates also attribute information and so forth relating to the copy information image. The information image management server 104 stores and records information (master information image data) regarding the master information image mentioned above and information (copy information image data) relating to the copy information image.

The information image management server 104 includes an apparatus information image management section 105 and a contents information image management section 106. Also the apparatus information image management section 105 and the contents information image management section 106 are information processing apparatus such as computers. Alternatively, the information image management server 104 may have functions of the apparatus information image management section 105 and the contents information image management section 106. The apparatus information image management section 105 stores and records information images ("apparatus information images") relating to operations of the apparatus 103 and so forth from among information images. The contents information image management section 106 stores and records information regarding information images ("contents information images") relating to contents the apparatus 103 has.

The contents are contents data and so forth possessed an apparatus has and include recorded programs recorded by the apparatus, contents data downloaded from a site or the like, and like contents data.

The apparatus information image management section 105 operates to provide an apparatus information image, information relating to the apparatus information image and other information to a client 108 that has accessed the apparatus information image management section 105 through the network 121. Further, the apparatus information image management section 105 performs grasping of an owner of an apparatus information image, setting of the access right to the owner and so forth.

The contents information image management section 106 can function also as an information image providing server configured so as to allow accessing to contents information images registered therein. The contents information image management section 106 operates to provide a contents information image, information relating to the contents information image and other information to a client 108 that has accessed the contents information image management section 106 through the network 121. Further, the contents information image management section 106 performs grasping of an owner of a contents information image, setting of the access right to the owner, and so forth.

Attribute information relating to a copy information image mentioned hereinabove is inputted to the information image management server 104 (apparatus information image management section 105 and contents information image management section 106) by a provider. It is to be noted that the attribute information relating to a copy information image is hereinafter described.

Meanwhile, according to a certain embodiment, the information image management server 104 functions as a providing server of an information image processing apparatus where a client 108 does not own an information image utilization supporting program as an information image processing apparatus necessary to display and operate an information image. Further, the information image management server 104 has a function of managing information regarding a user transmitted thereto from a client as a consideration for provision of an information image processing apparatus.

The folder management server 107 includes a folder management section 117 for managing a folder that stores information to be disclosed to each user. In particular, folders for exclusive use for the individual users are prepared in the folder management server 107. Although the information stored and managed for each user in and by the folder management section 117 may be any information, it is assumed here that the information is an information image owned by a user.

A client 108 is so-called information terminal equipment and at least has a function capable of displaying and operating an information image using information image processing means incorporated therein. More particularly, the clients include, for example, a personal computer, a portable information terminal, a portable telephone set, various appliances having an information terminal function and so forth.

Each of the clients 108 incorporates an information image processing apparatus (information image utilization supporting program and so forth) according to the present embodiment such that it can display an information image operation section 131 and a display section 132, and includes an action section 133 and an OS 134. An operator of the client performs an operation for an information image owned by the operator to display information regarding the information image on the display section 132 or starts and executes an application regarding the information image. For example, where the information image is an image relating to a music artist, the client downloads music data relating to the information image based on a destination of acquisition included in the information image and starts a playing program to play the music. On the other hand, where the information image relates to an operation of an apparatus (apparatus information image), the client would issue an instruction to operate the apparatus and use contents stored in the apparatus.

It is to be noted that, while, in the example shown in FIG. 1, the user management server 101, an apparatus management server 102 and a folder management server 107 are formed as hardware of separate bodies from each other, depending upon the configuration of the system, they may otherwise be combined arbitrarily so as to be formed as hardware of a common body.

Further, while, in the example shown in FIG. 1, an information image management server 104 (apparatus 103) and a client 108 are formed as hardware of separate bodies, depending upon the configuration of the system, they may otherwise be formed as hardware of a unitary member.

Further, the apparatus management servers 102 and the folder management servers 107 can be decentralized. For example, the user management section 111 may store and manage the locations of the apparatus management servers and folder management servers for individual relating users to achieve the decentralization. Further, information regarding the locations may be included in an information image.

The network 121 is formed such that it can bi-directionally circulate information data formatted in accordance with a predetermined protocol as represented by the Internet. It is to be noted that, while, in the present embodiment, the network 121 is the Internet configured open to the public, depending upon the configuration of the system, the network 121 may otherwise be configured for a closed environment such as, for example, a LAN or a WAN. Further, the network 121 may be any of a wireless network and a wire network.

(2. Structure of an Information Image)

Subsequently, the structure of an information image that plays a central part in the information image utilization system shown in FIG. 1 is described in detail.

An "information image" handled in the present embodiment is a unit of handling of image information, related information which causes an operator to perform a predetermined operation based on the image information, and other information. With the information image, a work such as transmission on a network can be achieved by a single handling process. It is to be noted that such "information images" are divided into a "master information image" and a "copy information image".

The "master information image" is an information image managed by an information image provider, and change of its contents and so forth are performed by the information image provider. The master information image is stored in and managed by the information image management servers 104, but duplication, migration and so forth of the master information image is not performed. The master information image includes specific information (a master ID, an apparatus ID, a provider user ID, a version, a type and so forth) for specifying the master information image.

The "copy information image" includes specific information (a serial ID, a version, a type, a master ID, a master position, an apparatus ID, a provider user ID and so forth) for specifying the copy information image similarly to the master information image. The copy information image is produced based on the master information image but has attribute information and so forth added thereto. When the copy information image becomes owned by an operator of a client, attribute information and so forth are set for each such client. Accordingly, even copy information images produced based on the same master image information can be provided with functions which are different among different users.

In this manner, the information image is characterized in (1) that it is composed of image information, related information, specific information, attribute information and so forth and (2) that image information, related information, specific information, attribute information and so forth can be processed as a single handling unit.

(2.1. Image Information)

The "image information" is information which can be specified based on image specific information such as, for example, a file name or identification information embedded in the image information and acts so as to be displayed as an image on an information display apparatus which is a client. More particularly, the image information is a data stream regarding an image which adopts any of various forms such as the GIF form, JPG form and PCX form.

(2.2. Related Information)

The "related information" is information based on which an operator of a terminal tries to cause the terminal to perform a particular operation using the information image as a clue. In particular, the related information is information related to an information image or image information. For example, when it is tried to cause an operator of a terminal to refer to information possessed by a particular server, information (an IP (Internet Protocol) address, a URL (Uniform Resource Locator) or the like) which specifies the information is regarded as the related information. However, when it is tried to cause a particular program to operate, a program name of the particular program or the program itself may be used as the related information. For example, the related information may be instruction information for acquiring new image information from a server.

(2.3. Specific Information)

The "specific information" is information for specifying an information image. In the case of a master information image, the specific information may be a master ID, an apparatus ID, a provider user ID, a version, a type of the information image and the like which are unique in the information image utilization system. In the case of a copy information image, the specific information may be a serial ID, a version, a type of the information image, a master ID of the source of production, a location (master position) of the master information image, an apparatus ID, a provider user ID and so forth which are unique in the information image utilization system. It can be discriminated whether or not the version of the copy information image is the latest information by comparing the version of the copy information image with the version of the master information image.

It is to be noted that, in the case of an apparatus information image hereinafter described, the specific information may include an IP (Internet Protocol) address or the like as a location (position information) of the apparatus.

(2.4. Attribute Information)

The "attribute information" defines handling of information relating to a copy information image. When a copy information image becomes owned by an operator of a client, attribute information and so forth are set for each client, or default attribute information and so forth are set. Also it is possible for a provider of an information image to change the attribute information. The attribute information may include plural position propriety, off-lining propriety, possession propriety, assignment propriety, introduction (forwarding) propriety, a term of validity, possession management existence, a signature, a certificate, and so forth.

The "plural position propriety" indicates whether or not a plurality of copy information images can be present in a folder on a folder management server relating to the same user.

The "off-lining propriety" indicates whether or not a copy information image can be off-lined (Exported).

The "possession propriety" indicates whether or not possession of a copy information image is possible, that is, whether or not it is possible to register the copy information image into a folder on a folder management server.

The "assignment propriety" indicates whether or not assignment of the copy information image, that is, movement between folders on a folder management server (change of registration between folders), is possible.

The "introduction (forwarding) propriety" indicates whether or not introduction (forwarding) of the copy information image to another user, that is, registration of the copy information image into a folder of another user on a folder management server, is possible.

The "term of validity" indicates a term within which the copy information image is valid in the information image utilization system. If the term of validity expires, then the copy information image is deleted automatically. Alternatively, it is possible to inhibit an operation for the information image or invalidate a report of an operation log of the information image to a management server after the term of validity expires. Or, it is possible to prescribe so that a certain predetermined operation is permitted only after the term of validity expires.

The "possession management existence" indicates whether or not, when the copy information image is possessed or deleted, a notification of a user ID relating to the possession of the copy information image is to be issued to the information image management server.

The "signature and certificate" are used for authentication and so forth.

In order to make it possible to process image information, related information, specific information, attribute information and so forth, which have such configuration as described above, as a handling unit, according to the present embodiment, such a technique as described below can be used to embed related information and the other information into particular image information.

(2.5. Configuration of an Information Image Which Contains Information)

A configuration of an information image which includes related information, specific information, attribute information and so forth is described with reference to FIGS. 2 to 5. It is to be noted that the information to be included in an information image may be, for example, related information, specific information, attribute information and an identifier for specifying the image.

(2.5.1. Format of a Master Information Image—Part 1)

FIG. 2 is a view illustrating master information image data 200 of a format of a master information image in which related information and specific information are embedded.

Here, an image of the GIF format is taken as an example of the image information. It is to be noted that the format of the image data need not be the GIF format but may be the JPG format or the PCX format.

A starting part 201 is a field provided for identification that the pertaining information is image information of the GIF format, and a character string of "GIF" and a version of it are allocated to the starting part 201.

Color table type image data 203 are image data wherein predetermined pixels are arrayed in order from the left to the right and from above to below. Here, in the case of the GIF, the color table type image data 203 are coded using the LZW algorithm of a variable length code.

A comment extension part 205 includes text information which does not form graphic information in a GIF data stream. In the comment extension part 205, all information can be contained including a name of a person relating to graphics or production, a comment regarding explanation of contents, other control information and information of the type which is not graphic data.

An ending part 206 indicates an end of a data stream beginning with the starting part 201, and signifies that it is not followed by any other parameter information or the like.

An intermediate part 202 between the starting part 201 and the color table type image data 203 and an intermediate part 204 between the color table type image data 203 and the comment extension part 205 can contain information other than the information described above. Information including parameters which define a region of a display apparatus necessary for an image to be plotted such as, for example, a screen width, a screen height and a color resolution can be allocated to the intermediate parts 202 and 204.

Specific information 207 (a master ID, an apparatus ID, a provider user ID, a version, a type and so forth) and related information 208 are placed as they are or after processing such as encryption in the comment extension part 205, and appear collectively as a single set of pieces of image information. As a result, image information as a data stream can include the related information and identifiers in the inside thereof.

While the descriptions given above all relate to the GIF format, the information other than the image information may be of any other image format if it is recorded in a region separate from the region in which the image information is recorded in this manner.

(2.5.2. Format of a Copy Information Image—Part 1)

FIG. 3 is a view illustrating copy information image data 300 of a format of a copy information image in which related information, specific information and attribute information are embedded.

The format of a copy information image is similar to the format of a master information image described above. In the case of the format of a copy information image, however, also attribute information 309 (plural position propriety, off-lining propriety, possession propriety, assignment propriety, introduction propriety, a term of validity, possession management existence, a signature, and a certificate) is placed in a comment extension part 305 together with specific information 307 (a serial ID, a version, a type, a master ID, a master position, an apparatus ID, a provider user ID and so forth) and related information 308.

(2.5.3. Format of a Master Information Image—Part 2)

Figure 4:
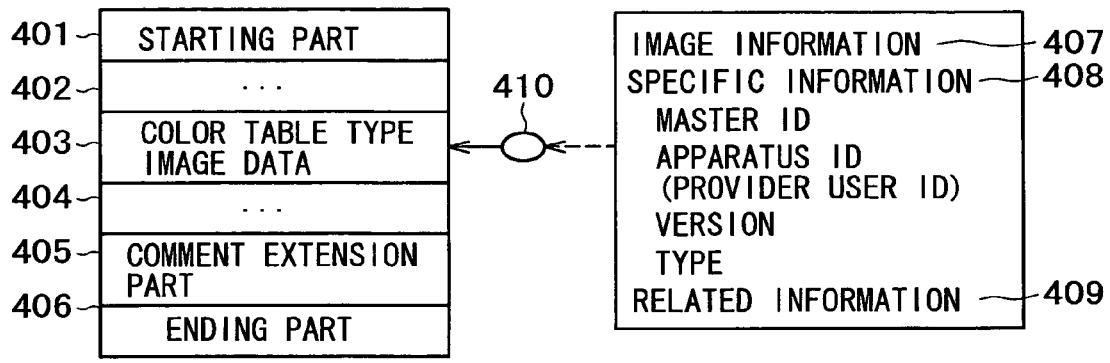
FIG. 4 is a view illustrating master information image data 400.

Subsequently, another embedding form into image information is described with reference to FIG. 4. FIG. 4 is a view illustrating master information image data 400 of another format of a master information image in which related information is embedded.

Also here, an image of the GIF format is taken as an example of image information. Also in the present example, for the format, the GIF format need not be taken, but the JPG format or the PCX may be adopted instead.

A starting part 401 is a field provided for identification that the information in question is image information of the GIF format, and the character string of "GIF" and a version of it are allocated to the starting part 401.

A color table type image data part 403 is a place into which image data of pixels are placed in an array wherein they are arrayed in order from the left to the right and from above to below. Here, however, image information 407, specific information 408 (a master ID, an apparatus ID, a provider user ID, a version and a type) and related information 409 are mixed 410 in a watermark fashion. Consequently, the related information is not visually observed as it is from a visual sense while the image information can be visually observed as it is. The information mixed 410 in this manner is encoded using the LZW algorithm of a variable length code.

A comment extension part 405 contains text information that does not make graphic information in a GIF data stream. In the present example, the comment extension part 405 is not specifically necessitated. However, if the comment extension part 405 is necessitated, then an information provider can utilize the comment extension part 405 with a free definition.

An ending part 406 indicates that the data stream is ended and signifies that it is not followed by any other parameter information or the like.

While also the present image example employs the GIF format, the image form of any other format may be used only if the information other than the image information is recorded in a region separate from the region in which the image information is recorded in this manner.

(2.5.4. Format of a Copy Information Image—Part 2)

Figure 5:
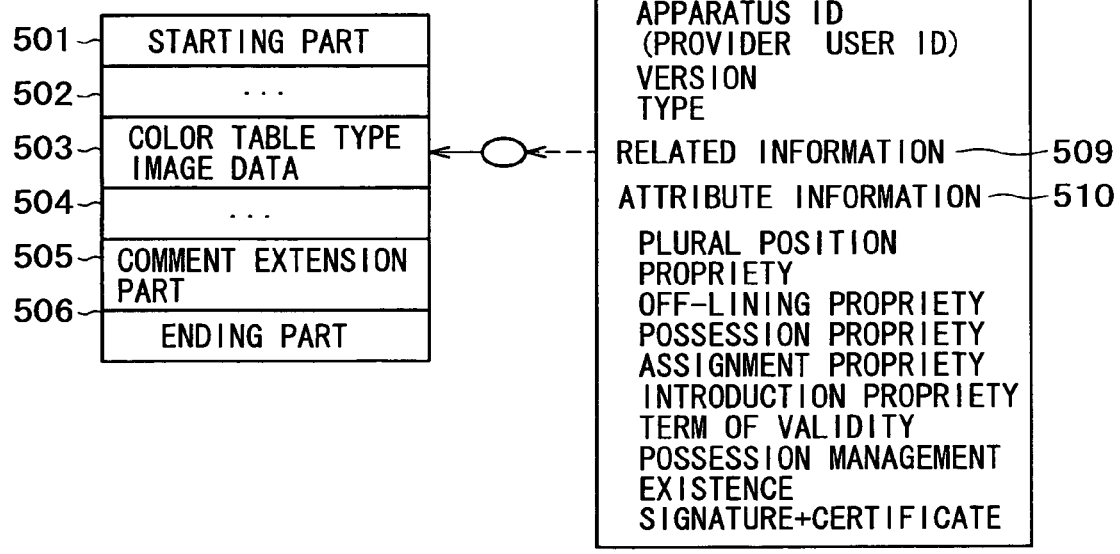
FIG. 5 is a view illustrating copy information image data 500.

FIG. 5 is a view illustrating copy information image data 500 of a format of a copy information image in which related information, specific information and attribute information are embedded.

The format of a copy information image shown in FIG. 5 is similar to the format of a master information image shown in FIG. 4, but includes attribute information and so forth placed therein. A color table type image data part 503 is a place into which image data of pixels are placed in an array wherein they are arrayed in order from the left to the right and from above to below. However, in the case of a copy information image, not only image information 507, specific information 508 (a serial ID, a version, a type, a master ID, an apparatus ID, a provider user ID and so forth) and related information 509 but also attribute information 510 (plural position propriety, off-lining propriety, possession propriety, assignment propriety, introduction propriety, a term of validity, possession management existence, a signature, and a certificate) are mixed 511 in a watermark fashion. Consequently, the related information is not visually observed as it is from a visual sense while the image information can be visually observed as it is. The information mixed 511 in this manner is encoded using the LZW algorithm of a variable length code.

(2.6. Example of a Data Configuration of an Information Image by XML Data)

It is possible to form the information image data described with reference to FIG. 2 to 5 from XML (EXTENSIBLE MARKUP LANGUAGE) data. The XML is a markup language characterized in that a tag can be defined autonomously. An information image can be realized with XML data wherein data relating to specific information, related information, attribute information and image information are embedded in a tag.

FIG. 6 is a view illustrating an example of a data configuration of an information image by XML data.

Descriptions 601 to 603 relate to specific information of a copy information image. The description 601 indicates a serial ID, and the description 602 indicates a version while the description 603 indicates a category.

Descriptions 604 to 606 relate to attribute information of a copy information image. The description 604 indicates possession (forwarding) propriety, and the description 605 indicates on-lining propriety while the description 606 indicates introduction propriety.

Descriptions 607 and 608 relate to related information of a copy information image. The description 607 is provided for displaying a table of contents data recorded in the apparatus and describes the location and so forth of the apparatus. The description 608 is provided for performing an operation of the apparatus and describes the location and so forth of the apparatus.

(3. Databases Managed by the Servers) (3.1. Database Managed by the User Management Server 101)

FIG. 7 is a view illustrating an example of a configuration of a database stored in and managed by the user management section 111 of the user management server 101. The user management section 111 stores and manages information relating users as a database. The configuration of the database is not limited to this but may be any configuration if authentication of a user and so forth can be performed.

In the example shown in FIG. 7, the user management section 111 stores a user management table 701. The user management section 111 can refer to the user management table 701 to perform authentication of a user who accesses the information image utilization system.

The user management table 701 includes a user ID 702, a password 703, a user attribute 704, an apparatus management server position 705, a folder management server position 706, and so forth. The user ID 702 is a code string formed from symbols, numerals, characters and so forth for specifying a user of the information image utilization system. The password 703 is a code string formed from symbols, numerals, characters and so forth used to authenticate a user. The user attribute 704 indicates an attribute of a user such as, for example, the name, an address, a user type (a general member, a special member or the like) or the like.

The apparatus management server position 705 indicates a location (position information on the network, an IP (Internet Protocol) address, a URL (Uniform Resource Locator) or the like) of an apparatus management server which includes an apparatus management table relating to the user ID 702. The folder management server position 706 indicates the location of a folder management server which includes a folder management table (folder) relating to the user ID 702.

The apparatus management server position 705 is referred to when an apparatus management server in which the apparatus is registered is to be specified or in a like case. The folder management server position 706 is referred to in order to specify, when a user tries to utilize the information image utilization system as an operator of a client 108, a folder management server which includes a folder management table (folder) relating to the user.

(3.2. Database Managed by an Apparatus Management Server 102)

FIG. 8 is a view illustrating an example of a configuration of a database stored in and managed by the apparatus management section 112 of each apparatus management server 102. The apparatus management section 112 stores and manages information relating to apparatus as a database. The configuration of the database is not limited to this but may be any configuration only if a situation (activated state or the like) of an apparatus can be grasped therefrom.

In the example shown in FIG. 8, the apparatus management section 112 stores an apparatus management table 801. The apparatus management section 112 can refer to the apparatus management table 801 to grasp a situation (activated state or the like) of an apparatus.

The apparatus management table 801 includes an apparatus ID 802, a status 803 and so forth. The apparatus ID 802 is a code string formed from symbols, numerals, characters and so forth for specifying an apparatus which can be utilized on the information image utilization system. The status 803 indicates a situation of an apparatus on the real time basis and indicates, for example, an activated state or the like.

(3.3. Database Managed by an Information Image Management Server 104)

Each of the information image management servers 104 stores and manages master information image data and copy information image data described hereinabove with reference to FIGS. 2 to 5. The information image management server 104 further manages master information images and providers of the master information images in a coordinated relationship and manages copy information images and owners of the copy information images in a coordinated relationship.

Figure 9:
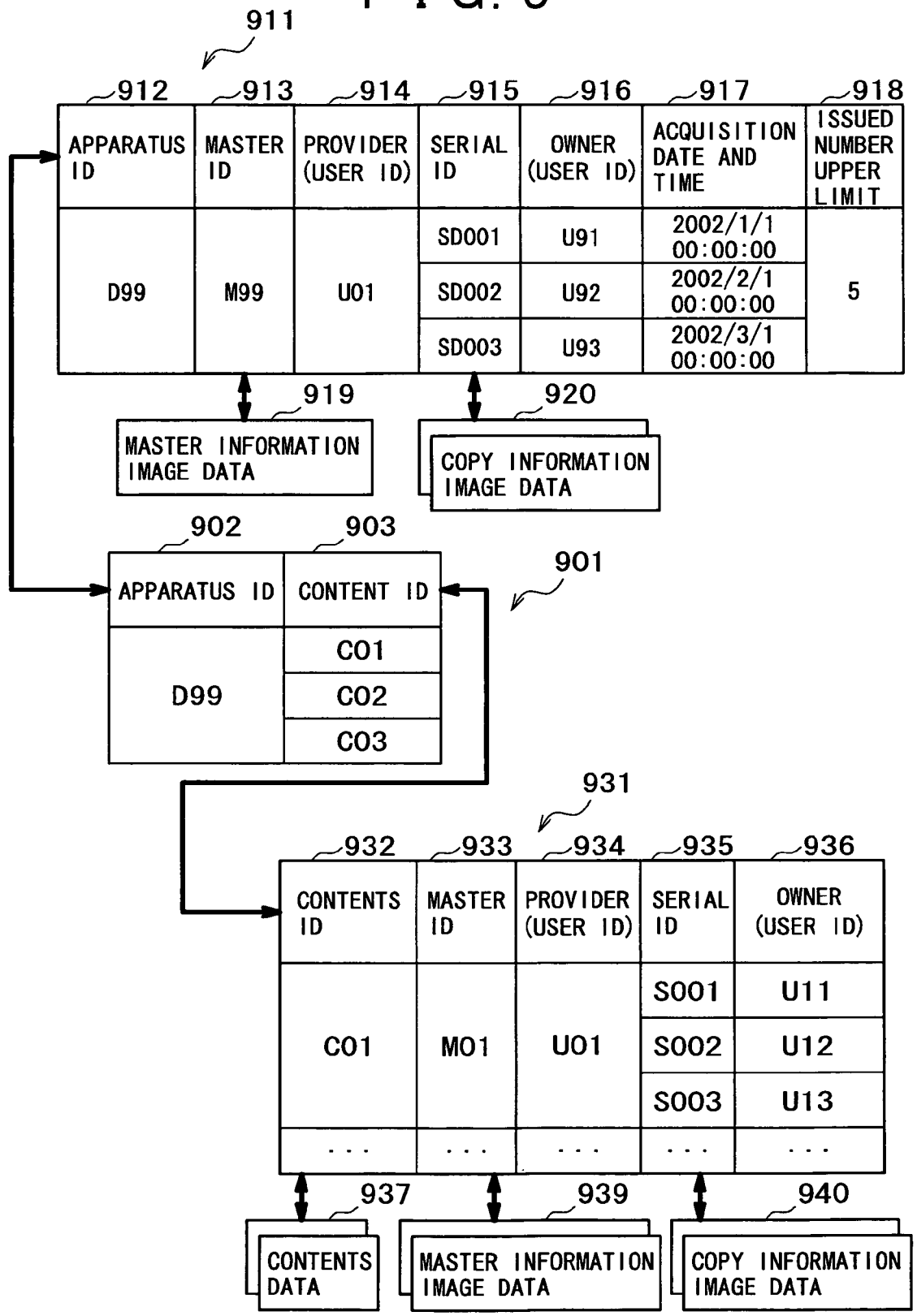
FIG. 9 is a view illustrating an example of a configuration of an information image management table 901, an apparatus information image management table 911 and a contents information image management table 931 stored in and managed by an information image management server 104.

FIG. 9 is a view illustrating an information image management table 901 (apparatus information image management table 911 and contents information image management table 931) stored in and managed by the information image management server 104. The configuration of the database is not limited to this but may be any configuration only if it coordinates information image data, information image providers and information image owners with each other.

The information image management server 104 includes an apparatus information image management section 105 and a contents information image management section 106. The apparatus information image management section 105 and the contents information image management section 106 store and manage an apparatus information image management table 911 and a contents information image management table 931, respectively.

The information image management table 901 coordinates an apparatus ID 902 and a contents ID 903. It is to be noted that, since the information image management table 901 normally relates to a single apparatus, there is no necessity to particularly coordinate an apparatus ID and a contents ID with each other. However, the information image management table 901 is used in the present embodiment from the reason that information images relating to apparatus and information images relating to contents can be managed consistently and so forth.

The apparatus information image management table 911 stores and manages information relating to information images indicating apparatus (apparatus information images). The apparatus information image management table 911 stores and manages an apparatus ID 912, a master ID 913, a provider 914, a serial ID 915, an owner 916, an acquisition date and time 917, an issued number upper limit 918 and so forth in a coordinated relationship with each other.

The apparatus ID 912 is a code string formed from numerals, characters, symbols and so forth for specifying an apparatus. The master ID 913 is a code string formed from numerals, characters, symbols and so forth for specifying a master information image. The provider 914 is a user ID of a provider of a master information image, and normally of an owner of the apparatus or the like. The serial ID 915 is a code string formed from numerals, characters, symbols and so forth for specifying a copy information image. The owner 916 is a user ID of an owner of a copy information image. It is to be noted that the "owner" is a user who has registered a copy information image in a folder for use by the user itself on a folder management server 107.

The acquisition date and time 917 indicates the date and time on which an owner acquired a copy information image. The issued number upper limit 918 indicates an upper limit to the provided number (issued number) of apparatus information images (copy information images).

When an information image management server 104 tries to provide (issue) an apparatus information image newly and exceeds the issued number upper limit 918, the information image management server 104 refers to the acquisition date and time 917 to delete the oldest apparatus information image (copy information image) or fully disable setting of the access right. In this instance, disordered utilization of apparatus information images relating to one apparatus and hence disordered common use of contents data possessed by the apparatus can be eliminated.

The apparatus information image management table 911 and master information image data 919 are related to each other with the master ID 913 and a master ID of specific information included in the master information image data 919. The serial ID 915 and a serial ID of specific information included in copy information image data 920 are related to each other. It is to be noted that the master information image data 919 corresponds to the master information image data 200 and the master information image data 400 shown in FIGS. 2 and 4. The copy information image data 920 corresponds to the copy information image data 300 and the copy information image data 500 shown in FIGS. 3 and 5.

The contents information image management table 931 stores and manages information relating to information images (contents information images) indicating contents. The contents are contents data stored in the apparatus, and are a recorded program recorded by the apparatus, contents data downloaded from a site or the like, and so forth.

The contents information image management table 931 stores and manages a contents ID 932, a master ID 933, a provider 934, a serial ID 935, an owner 936 and so forth in a coordinated relationship with each other.

The contents ID 932 is a code string formed from numerals, characters, symbols and so forth for specifying contents. The master ID 933 is a code string formed from numerals, characters, symbols and so forth for specifying a master information image. The provider 934 is a user ID of a provider of the master information image. The serial ID 935 is a code string formed from numerals, characters, symbols and so forth for specifying a copy information image. The owner 936 is a user ID of an owner of the copy information image. It is to be noted that the "owner" is a user who has registered a copy information image in a folder for the user itself on a folder management server 107.

The contents information image management table 931 and contents data 937 are related to each other with the contents ID 932.

The contents information image management table 931 and master information image data 939 are related to each other with the master ID 933 and a master ID of specific information included in the master information image data 939. The contents information image management table 931 and copy information image data 940 are related to each other with the serial ID 935 and a serial ID of specific information included in the copy information image data 940.

It is to be noted that the master information image data 939 corresponds to the master information image data 200 and the master information image data 400 shown in FIGS. 2 and 4. The copy information image data 940 corresponds to the copy information image data 300 and the copy information image data 500 shown in FIGS. 3 and 5.

The information image management server 104 can change contents of a master information image relating to an apparatus information image or a contents information image, add attribute information to produce copy information image data, grasp an owner of the copy information image, or change the attribute information of the copy information image data for each owner or for each predetermined operation in the information image management table 901 (apparatus information image management table 911 and contents information image management table 931) in accordance with an instruction of a user who owns an apparatus or the like.

It is to be noted that a user who owns an apparatus or the like input an instruction for the information image management server 104 directly to the apparatus or indirectly through a network from a client. In the latter case, the information image management server 104 can refer to the provider 914 and the,provider 934 to discriminate whether or not the user is authorized to change or set contents of the information image management table 901 (apparatus information image management table 911 and contents information image management table 931).

(3.4. Database Managed by a Folder Management Server 107)

Each of the folder management servers 107 includes a folder management section 117. The folder management section 117 manages a folder that stores information to be disclosed for each user. In particular, each user (operator or the like of a client) has a folder for exclusive use by the user itself on a folder management server. Each user owns a copy information image by registering it into the folder of the user itself.

It is to be noted that it is not necessary to record copy information image data into the folder in order to own a copy information image. At least, it is necessary to record the serial ID of the copy information image. In this instance, if a request for provision of an information image owned by a user of a client is received from the client, then the folder management server 107 issues a request for copy information image data to the information image management server 104 based on the serial ID recorded in the folder of the user of the client. Consequently, the folder management server 107 can provide the copy information image data to the client.

Figure 10:
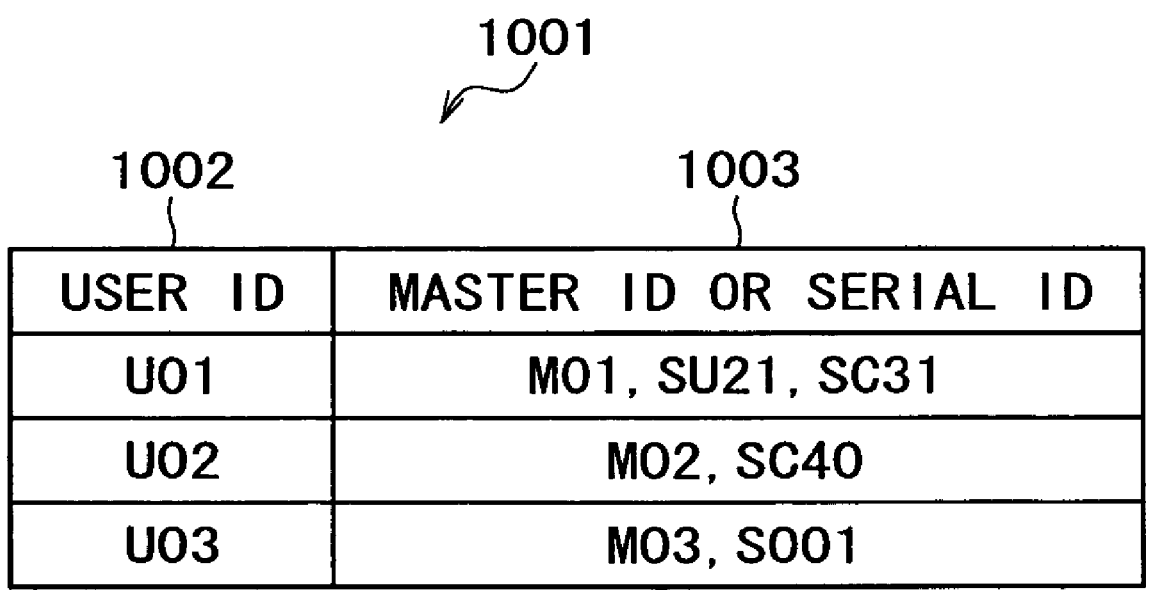
FIG. 10 is a view illustrating a folder management table 1001 stored in and managed by a folder management section 117 of a folder management server 107.

FIG. 10 is a view showing a folder management table 1001 stored in and managed by the folder management section 117 of the folder management server 107. It is to be noted that the configuration of the database is not limited to this but may be any configuration only if it coordinates users such as a provider and operators and information images with each other.

The folder management table 1001 coordinates a user ID 1002 and a serial ID 1003. The user ID 1002 is a user ID of a provider, an operator or the like. As the serial ID 1003, a serial ID of a copy information image owned by a user specified with the user ID 1002 or a master ID of a master information image relating to the user is recorded. It is to be noted that, from a technical reason or from a reason of convenience, when necessary, attribute information of a copy information image, other information image data and so forth may be recorded additionally in the folder management table 1001.

(3.5. Decentralization of the Servers)

The load to the information image utilization system can be decentralized by disposing the apparatus management servers 102 and the folder management servers 107 in a decentralized state.

In order to achieve decentralization of the servers, when any of the user management server 101, apparatus management servers 102, information image management servers 104 and folder management servers 107 accesses another one of them, the access destination and the access source may be recorded. Alternatively, the location (position on the network, IP (Internal Protocol) address or URL (Uniform Resource Locator)) of each of an apparatus management server 102 and a folder management server 107 which correspond to each user may be recoded into the user management table 701. Or, the locations of the servers may be recorded into the information image.

In this instance, each of the information image management server 104 and the client 108 can access the corresponding apparatus management server 102 and folder management server 107. Further, since information image data contain an apparatus ID and so forth as specific information as described hereinabove with reference to FIGS. 2 and 4, the folder management server 107 can access the information image management server 104 and so forth which correspond to the apparatus ID and so forth.

(4. Outline of Action of the Information Image Utilization System)

Figure 11:
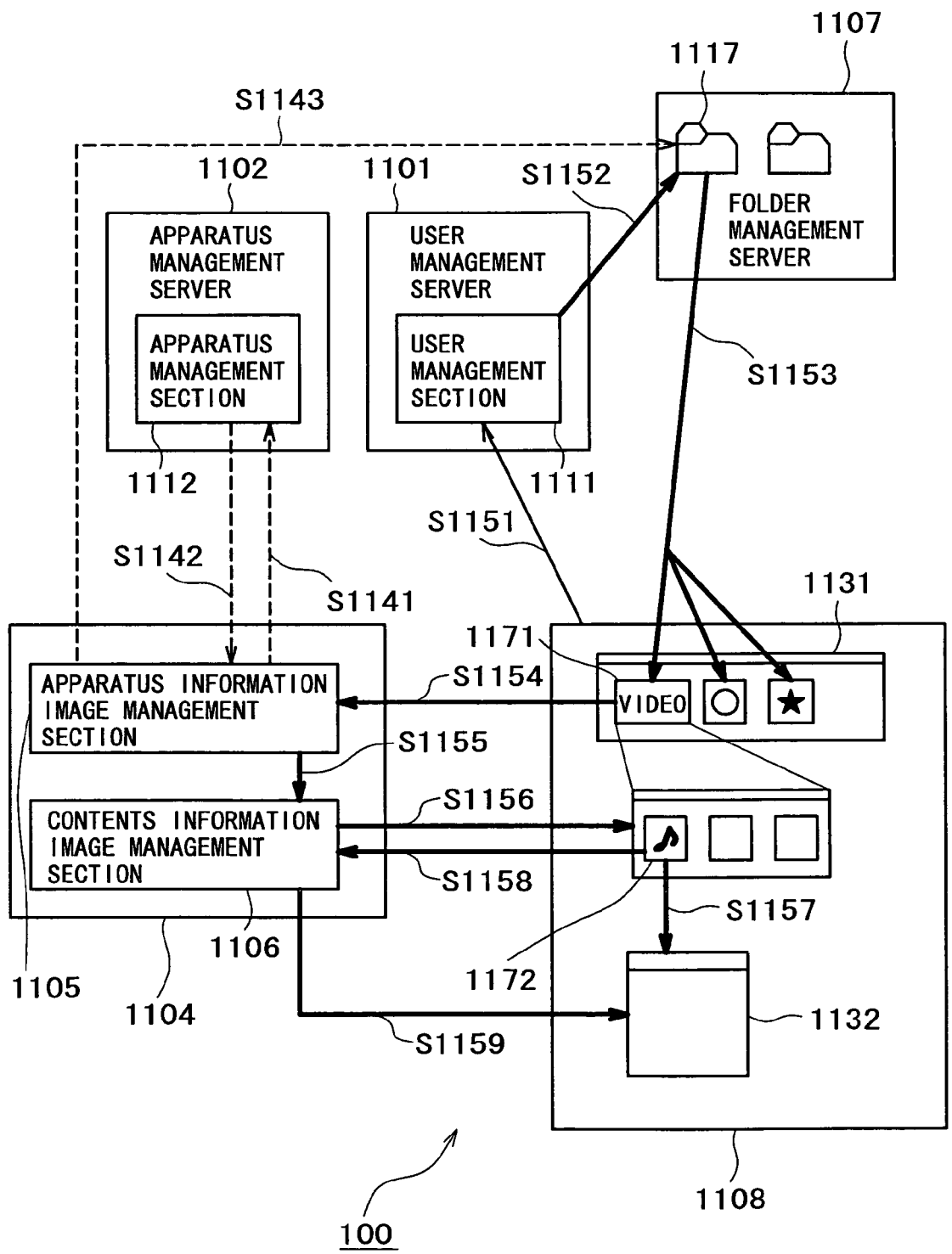
FIG. 11 is a view illustrating an outline of action of the information image utilization system 100.

An outline of action of the information image utilization system is described with reference to FIG. 11. FIG. 11 is a view illustrating an outline of action of the information image utilization system 100.

(4.1. Action of the Information Image Utilization System Relating to the Information Image Management Server)

An information image management server 1104 (apparatus information image management section 1105) of an apparatus 1103 such as a video recorder accesses an apparatus management server 1102 and issues a request for issuance of an apparatus ID (S1141). The apparatus management server 1102 issues an apparatus ID and sends a notification of the apparatus ID to the information image management server 1104 of the apparatus (S1142). The information image management server 1104 (apparatus information image management section 1105) produces and records an apparatus information image and registers it into a folder 1117 of an owner of the apparatus (S1143).

(4.2. Action of the Information Image Utilization System Relating to a Client)

A client 1108 accesses a user management server 1101 and is authenticated by the user management server 1101 (S1151). The user management server 1101 transmits a result of the authentication to a folder management server 1107 (S1152). The folder management server 1107 transmits information image data registered in the folder 1117 of the user of the client 1108 and therefore owned by the user to the client 1108 (S1153).

It is to be noted that, when the folder management server 1107 transmits copy information image data, it may otherwise receive apparatus information image data and so forth provided from the information image management server 1104 or the like based on the serial ID recorded in the folder 1117. The client 1108 displays an apparatus information image 1171 and so forth on an information image operation section 1131.

If the user performs a predetermined operation for the apparatus information image 1171, then the client 1108 accesses the information image management server 1104 based on the apparatus ID contained in the apparatus information image 1171, the location of the apparatus and so forth (S1154). The information image management server 1104 extracts a contents information image stored therein (S1155) and transmits it to the client 1108 (S1156). The client 1108 displays a contents information image 1172 and so forth.

If a predetermined operation is performed for the contents information image 1172, the client 1108 displays contents of information contained in the contents information image 1172 on a display section 1132 (S1157). Further, the client 1108 issues a request for provision of contents data to a contents information image management section 1106 of the information image management server 1104 based on an acquisition destination (location of the apparatus or contents information image management section or the like) of related information contained in the contents information image 1172 (S1158). The contents information image management section 1106 transmits the contents data to the client 1108 in response to the request (S1159). Thus, the client 1108 displays the contents data on the display section 1132. For example, where the contents data is a recorded music program, the music program is displayed and played on the client.

In addition to the action described above, the user who is an owner of the apparatus or the like may issue an instruction for production of a copy information image, an instruction to change attribute information of the copy information image, a request for provision of a situation of possession of the copy information image or the like to the information image management server 1104 directly or through the network from the client. In this instance, the information image management server 1104 performs production of a copy information image, change of the attribute information of the copy information image, provision of a situation of possession of the copy information image or the like.

It is to be noted that contents of data stored in the information image management server 1104 and contents of data stored in the folder management server 1107 are synchronized with each other at a predetermined timing so that they may keep the compatibility therebetween.

(5. Apparatus Information Image)

As types of an information image, not only an ordinary information image but also an apparatus information image and so forth are available. The ordinary information image has only a referring function to information relating to the information image. The apparatus information image not only has an information referring function but also plays a role of an authentication function and so forth when a client issues an operation instruction, a request for provision of contents or the like to an apparatus (apparatus registered in an apparatus management server) It is to be noted that the apparatus may be any of a computer, an information portable terminal, a portable telephone set, an appliance, various apparatus and so forth and has an information image management server described above.

(5.1. Registration of an Apparatus)

First, action of the information image utilization system when apparatus registration is performed and an apparatus information image is produced is described.

FIG. 12 is an information flow diagram illustrating action of an information image management server 104 (apparatus information image management section 105), the user management server 101, an apparatus management server 102 and a folder management server 107 in apparatus registration and production of an apparatus information image.

It is to be noted that the following description proceeds under the assumption that an apparatus 103 has the information image management server 104.

The information image management server 104 transmits the user ID of an owner of the apparatus 103 to the apparatus management server 102 to request for apparatus registration (step 1202). In this instance, if the apparatus management server is provided in a decentralized state, then the information image management server 104 may access the user management server to acquire the position of the apparatus management server corresponding to the user ID (step 1201). Alternatively, information regarding the position of the apparatus management server (the position of the apparatus management server corresponding to the apparatus, or the coordination of the user ID and the position of the apparatus management server or the like) may be recorded in advance in the apparatus (information image management server).

The apparatus management server 102 performs a registration process and issues an apparatus ID (step 1204) and transmits a result of the registration to the information image management server 104 (step 1205).

It is to be noted that, when the apparatus management server 102 issues an apparatus ID, it may perform a confirmation of whether or not the user ID is appropriate through the user management server 101 (step 1203). In this instance, at step 1202, the information image management server 104 may issue a request not only for the user ID but also for a password and so forth.

The information image management server 104 produces an apparatus information image representative of the apparatus 103 based on the issued apparatus ID and registers it as an apparatus information image management table 911 into the apparatus information image management section 105 (step 1206).

The information image management server 104 issues a request to the folder management server 107 to register the produced apparatus information image into a folder (folder management section 117) corresponding to the user ID (step 1208).

In this instance, where the folder management server is provided in a decentralized state, the information image management server 104 may access the user management server 101 to acquire the position of the folder management server corresponding to the user ID (step 1207).

The folder management server 107 registers the apparatus information image into the folder corresponding to the user ID (step 1209) and issues a response representing this to the information image management server 104 (step 1210).

The apparatus information image is registered into the folder of the user of the owner of the apparatus after the apparatus information image is produced at steps 1207 to 1210. Consequently, the user (owner of the apparatus or the like) can introduce (forward) the apparatus information image to another user from the client.

(5.2. Provision (Issuance) of an Apparatus Information Image)

Subsequently, action of the information image utilization system when an apparatus information image is provided (issued) is described.

Figure 13:
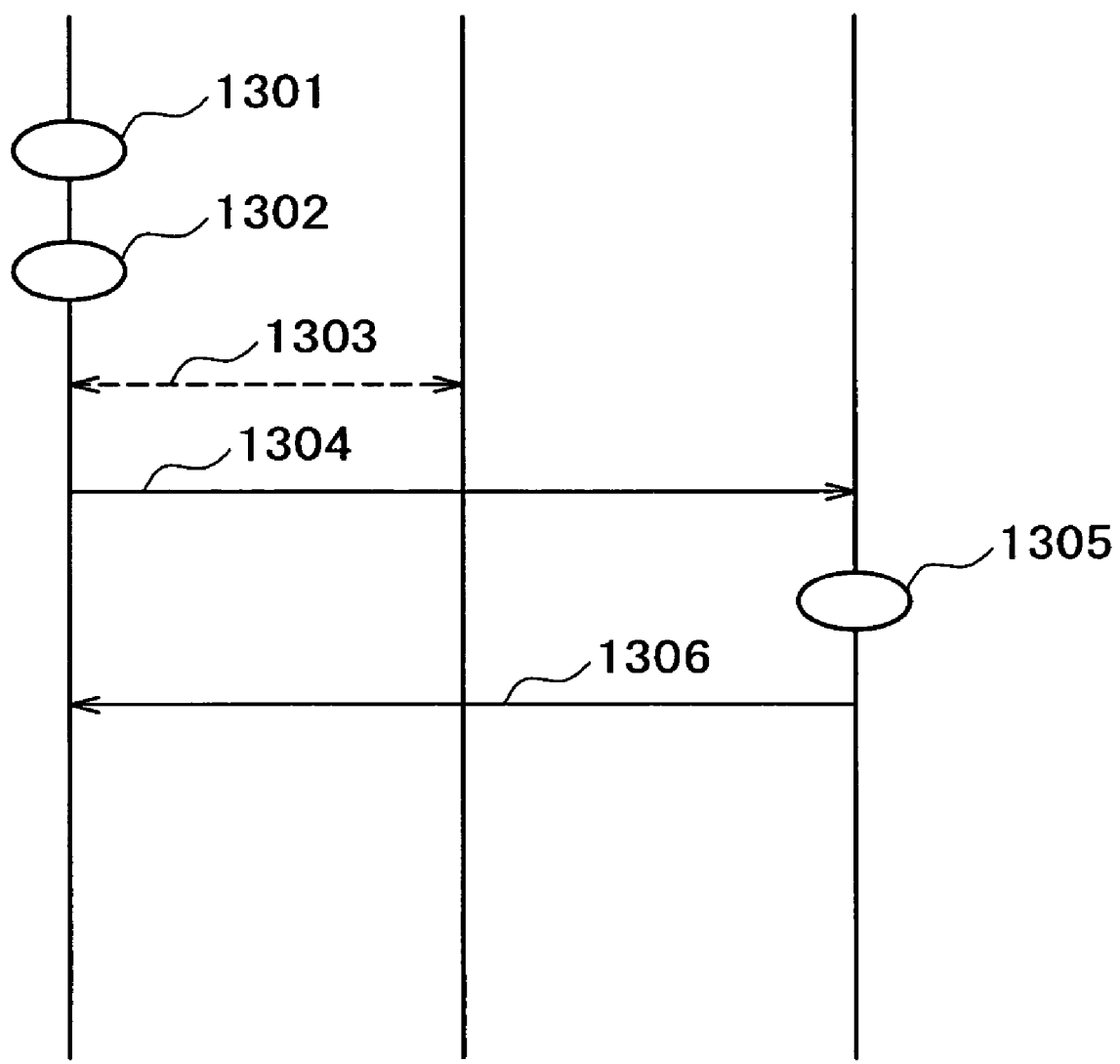
FIG. 13 is an information flow diagram illustrating action of the information image management server 104 (apparatus information image management section 105), user management server 101 and folder management server 107 upon provision (issuance) of an apparatus information image.

FIG. 13 is an information flow diagram illustrating action of an information image management server 104 (apparatus information image management section 105), the user management server 101 and a folder management server 107 in provision (issuance) of an apparatus information image.

It is to be noted that the following description process under the assumption that provision (issuance) of an apparatus information image corresponds to introduction (forwarding) of the apparatus information image to a different user. By the provision (issuance), also the different user is allowed to access an apparatus indicated by the apparatus information image, and can therefore utilize the apparatus or utilize contents data and so forth stored in the apparatus.

If the information image management server 104 receives an instruction to provide (issue) an apparatus information image and a user ID of a destination of provision (destination of issuance) is inputted, then the information image management server 104 confirms the provided number (issued number) of apparatus information images (copy information images) in the apparatus information image management table 911. Then, if the information image management server 104 discriminates that the provided number (issued number) reaches the upper limit to the issued number, then the information image management server 104 deletes the oldest apparatus information image (copy information image) or disables all access rights (step 1301).

The information image management server 104 produces an apparatus information image (copy information image) for provision (issuance) and adds a serial ID to the apparatus information image. Then, the information image management server 104 records the resulting apparatus information image as an apparatus information image management table 911 into the apparatus information image management section 105 (step 1302).

The information image management server 104 issues a request to the folder management server 107 to register the produced apparatus information image into a folder (folder management section 117) corresponding to the inputted user ID (step 1304).

In this instance, where the folder management server is provided in a decentralized state, the information image management server 104 may access the user management server 101 to acquire the position of the folder management server corresponding to the user ID (step 1303).

The folder management server 107 registers the apparatus information image into the folder corresponding to the user ID (step 1305) and issues a response representing this to the information image management server 104 (step 1306).

(5.3. Operation of an Apparatus Through an Apparatus Information Image)

Subsequently, operation of an apparatus performed through an apparatus information image from among utilization forms of an apparatus information image is described. In the following, action of the information image utilization system when recording reservation of a television program as an operation of an apparatus is performed for a video recorder as the apparatus through an apparatus information image is described with reference to FIGS. 14 to 16.

Figure 14:
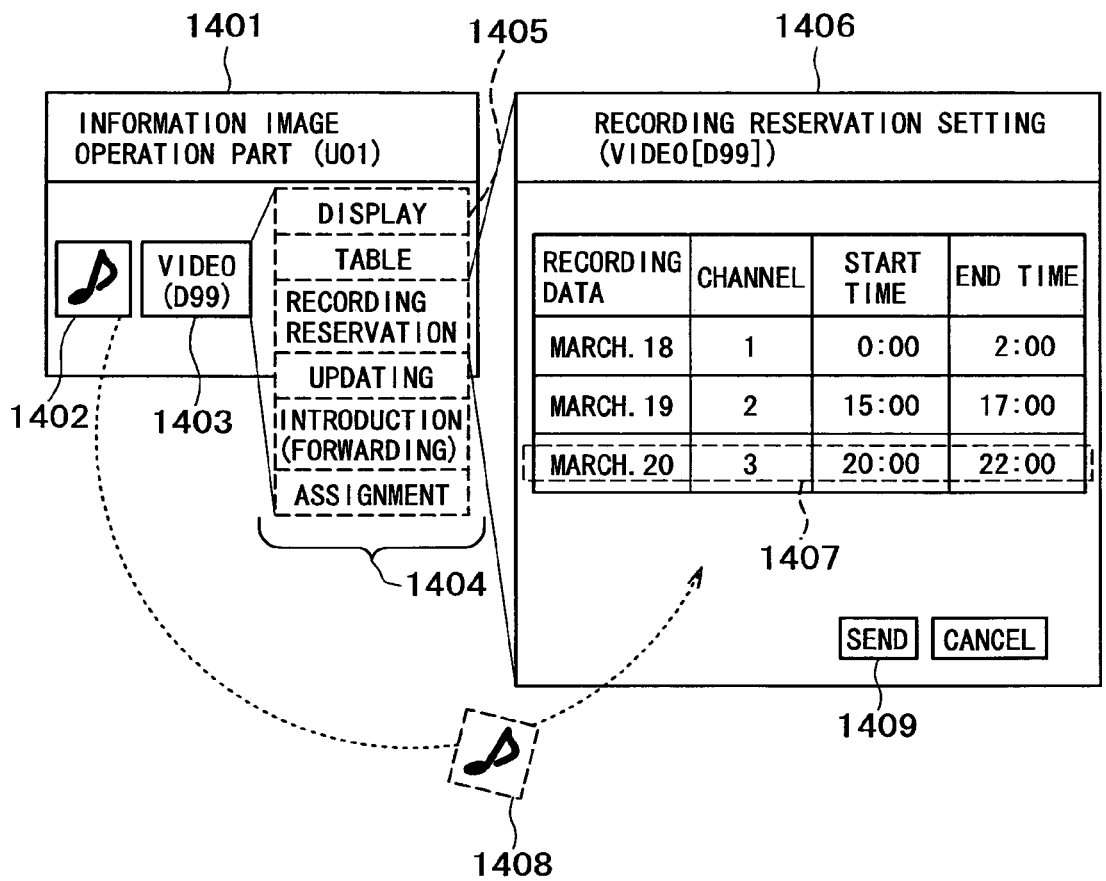
FIG. 14 is a view illustrating a flow wherein operation of an apparatus is performed through an apparatus information image.
Figure 15:
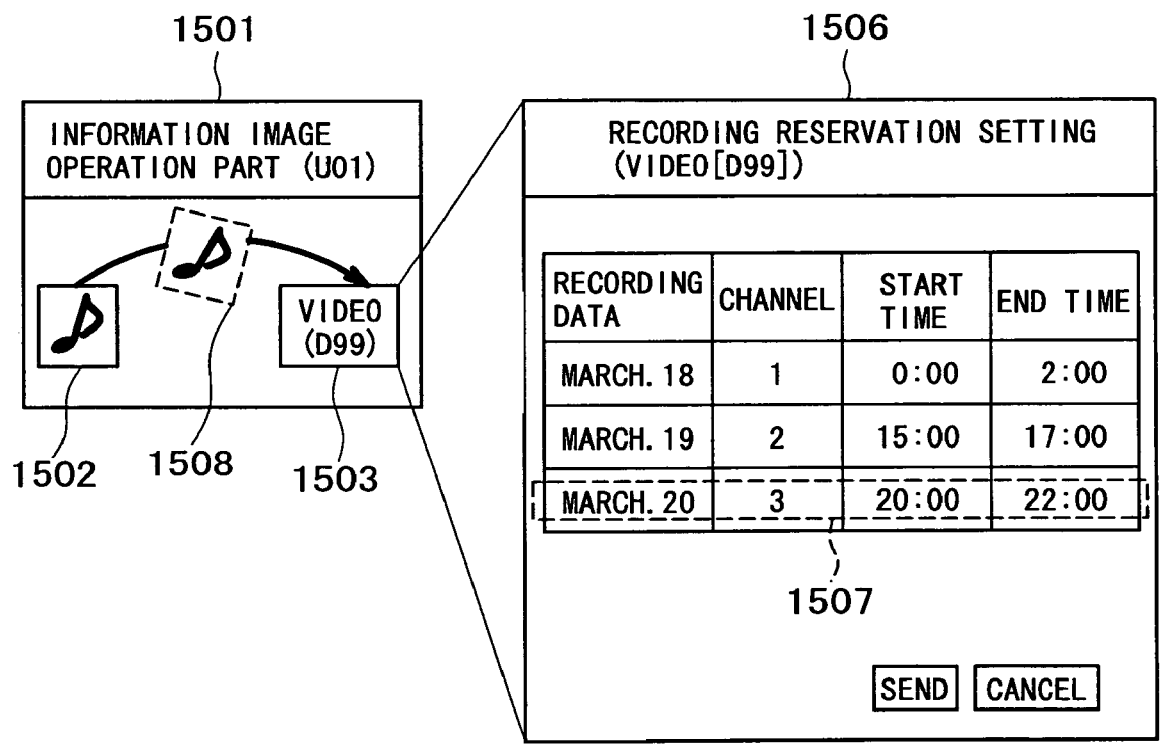
FIG. 15 is a view illustrating a flow wherein operation of an apparatus is performed through an apparatus information image.

FIGS. 14 and 15 are views illustrating a flow wherein a user (user ID "U01") of a client 108 performs an operation of an apparatus (recording reservation of a video recorder) through an apparatus information image.

Figure 16:
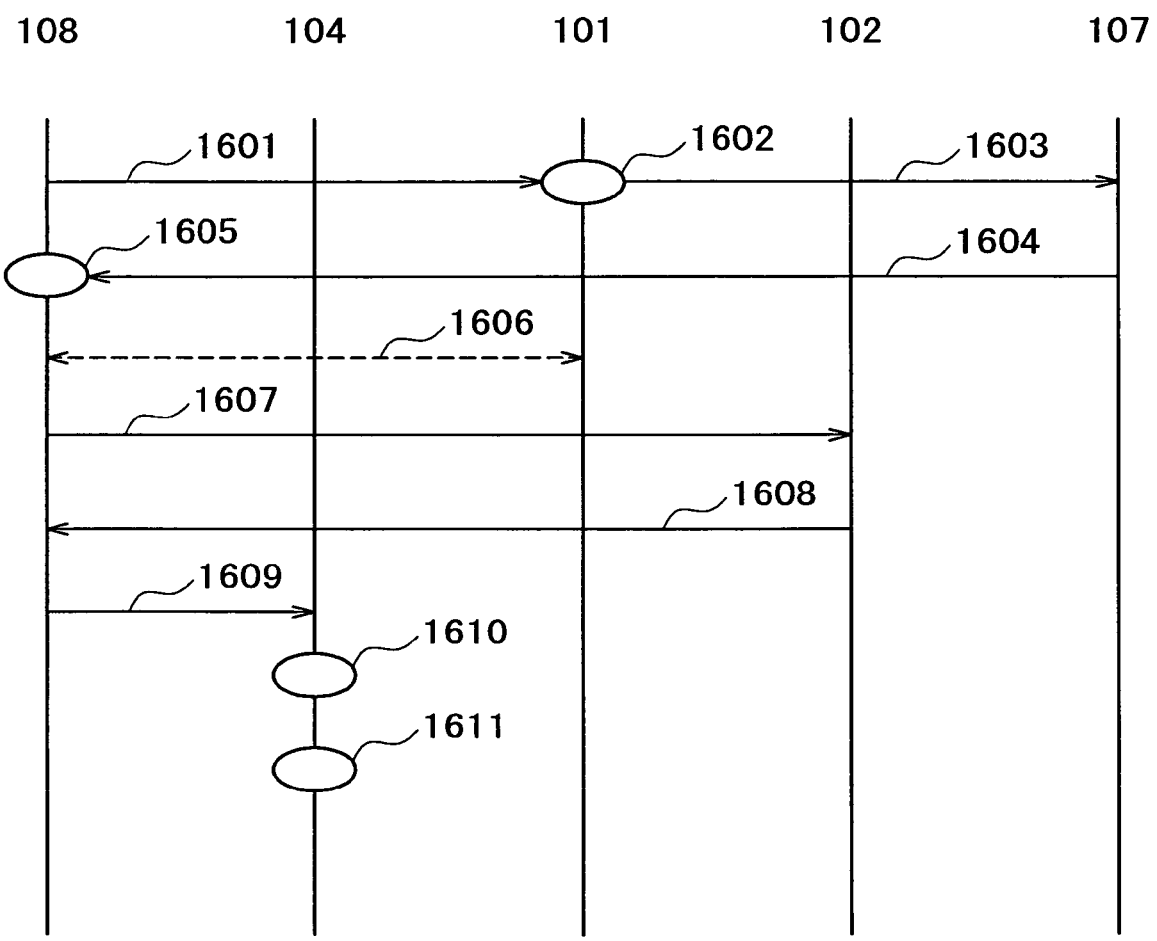
FIG. 16 is an information flow diagram illustrating action of the information image utilization system when operation of an apparatus is performed through an apparatus information image.

FIG. 16 is an information flow diagram illustrating action of the information image utilization system when the user (user ID "U01") of the client 108 performs an operation of the apparatus (recording reservation of the video recorder).

The client 108 inputs the user ID and a password to access the user management server 101 (step 1601).

The user management server 101 refers to the user management table 701 to perform authentication of the user of the client 108 based on the user ID and the password inputted (step 1602). Then, the user management server 101 issues an instruction to the folder management server 107 corresponding to the user ID to transmit copy information image data owned by the user to the client 108 (step 1603).

The folder management server 107 transmits the copy information image data owned by the user to the client 108 (step 1604). Thereupon, as the need arises, data relating to the copy information image may be acquired from the information image management server 104 or the like based on the serial ID or the like stored in the folder management server 107.

The client 108 displays the copy information image (apparatus information image or the like) owned by the user on the information image operation section 131 (step 1605) (refer to an information image operation part 1401 (FIG. 14) and an information image operation part 1501 (FIG. 15)).

The client 108 transmits, if some operation (menu item selection, activation of the action or the like) is performed for the apparatus information image, the apparatus ID contained in the apparatus information image to the apparatus management server 102 and transmits a request for notification of a state of the apparatus indicated by the apparatus information image (step 1607).

In this instance, where the apparatus management server is provided in a decentralized state, the client 108 may access the user management server 101 to acquire the position of the apparatus management server corresponding to the provider user ID included in the apparatus information image (step 1606). Alternatively, information regarding the position of the apparatus management server may be contained in the apparatus information image.

The apparatus management server 102 refers to the apparatus management table 801 and issues a notification of a situation (activated state or the like) of the apparatus indicated by the apparatus information image to the client 108 (step 1608).

Referring to FIGS. 14 and 15, an apparatus information image 1403 and an apparatus information image 1503 indicate a video recorder (apparatus ID "D99"). An information image 1402 and an information image 1502 are information images relating to a television program and contain information relating to recording reservation. The information image 1402 and the information image 1502 are acquired by the user of the client 108 by one of the following methods. In particular, they are (1) acquired from a homepage or the like, (2) acquired from a mail to which they are attached, (3) acquired through a recording medium such as a flexible disk, (4) acquired from a poster on the street through a portable terminal, or (5) acquired from some other user.

Referring to FIG. 14, if the user performs a predetermined operation (left click of a mouse or the like) for the apparatus information image 1403 (apparatus ID "D99"), then the client 108 displays a rich menu 1404.

If the user performs a predetermined operation (left click of the mouse or the like) for an item 1405 "recording reservation", then the client 108 displays a recording reservation window 1406. The user would input a recording reservation item 1407 into the recording reservation window.

It is to be noted that inputting of the recording reservation item 1407 may be performed by a drag-and-drop operation 1408 with the mouse of the information image 1402, which contains information regarding the recording reservation item, into the recording reservation window 1406 using the mouse.

Further, referring to FIG. 15, setting of a recording reservation item 1507 may be performed in the following manner without intervention of a rich menu. In particular, a drag-and-drop operation 1508 of the information image 1502 which contains information relating to the recording reservation item into the apparatus information image 1503 using the mouse is performed so that the client 108 displays a recording reservation window 1506 such that the recording reservation item 1507 may be inputted.

After the client 108 confirms through the processing at steps 1607 to 1608 described above that the apparatus of an object of operation is in an activated state (the power supply is ON or the like) in this manner, the client 108 may issue a "recording reservation" instruction. In response to the instruction, the client 108 accesses the information image management server 104 provided in the apparatus corresponding to the apparatus information image based on position information (location information) of the apparatus 103 (video recorder) contained in the apparatus information image and issues a "recording reservation" instruction (step 1609).

The information image management server 104 performs "recording reservation" for the apparatus 103 (video recorder) (step 1610). After the apparatus 103 (video recorder) completes recording in accordance with the recording reservation, the information image management server 104 records recording data as contents data. Further, the information image management server 104 produces a contents information image relating to the contents data and records it as a contents information image management table 931 into the contents information image management section 106 (step 1611).

Through the process described above, the client 108 issues an operation instruction to an apparatus indicated by the apparatus information image through the apparatus information image. It is to be noted that, when a contents information image is produced, a contents ID which is a code train formed from characters, numerals, symbols and so forth for identification of contents data may be contained as specific information.

It is to be noted that the rich menu 1404 is displayed based on related information contained in the apparatus information image 1403. For example, the rich menu 1404 indicates "display" (display of contents of an apparatus information image (type of the apparatus, state of the apparatus (activated state or the like) and so forth)), "table" (table of contents recorded in the apparatus), "recording reservation" (setting of recording reservation), "update" (version up of an information image or the like), "introduction (forwarding)" (introduction (forwarding) of an information image or the like), "assignment" (assignment of an information image or the like), and so forth.

Further, availability of the items of the rich menu 1404 is determined by attribute information contained in the apparatus information image 1403. Although detailed description is hereinafter given, for example, when the apparatus information image 1403 owned by a user (user ID "U02") contains attribute information of "recording reservation inhibited", the item "recording reservation" is not displayed on the rich menu 1404 or is displayed by a transmission color display or the like. Thus, the user cannot perform a recording reservation operation for the apparatus 103. Similarly, the user cannot perform a recording reservation operation by a drag-and-drop operation illustrated in FIG. 15 either.

(5.4. Other Utilization Forms of an Apparatus Information Image)

Subsequently, other utilization forms of an apparatus information image are described. An apparatus information image can play various roles relating to an operation of an apparatus, provision of contents the apparatus has and so forth by determining various utilization items (predetermined actions) in related information contained in the apparatus information image. Processes relating to an apparatus information image may be such processes as downloading of contents stored in the apparatus, streaming reproduction of the contents, deletion of the contents and so forth in addition to the operations of the apparatus described above (recording reservation of a video recorder and so forth).

Here, action of the information image utilization system relating to streaming reproduction of contents through an apparatus information image from among the utilization forms of an apparatus information image described above is described with reference to FIGS. 17 and 18.

Figure 17:
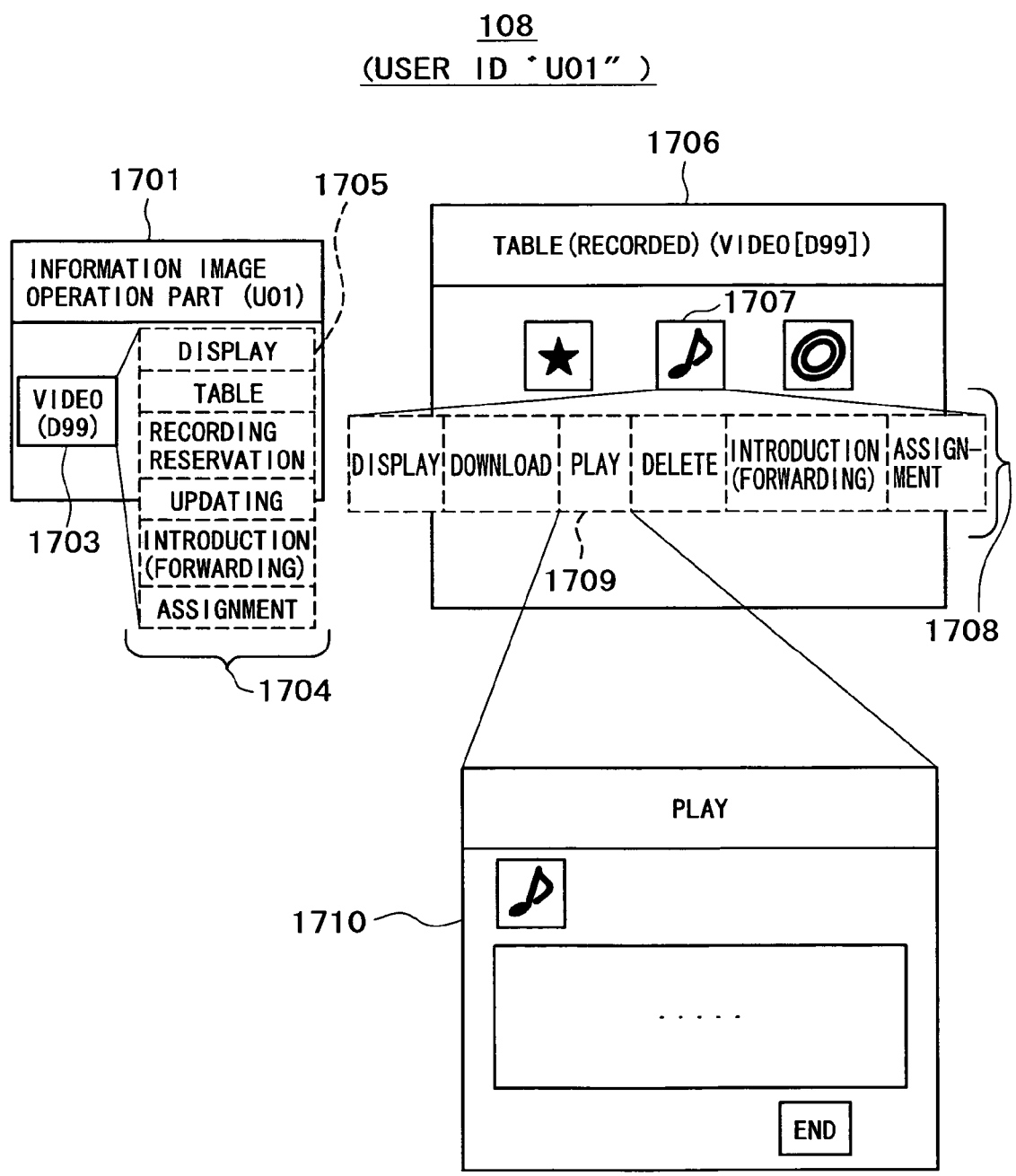
FIG. 17 is a view illustrating a flow wherein contents recorded in an apparatus are streaming-reproduced on a client through an apparatus information image.

FIG. 17 is a view illustrating a flow wherein a user (user ID "U01") of a client 108 performs streaming reproduction of contents recorded in an information image management server 104 of an apparatus 103 on the client 108 through an apparatus information image (apparatus ID "D99").

Figure 18:
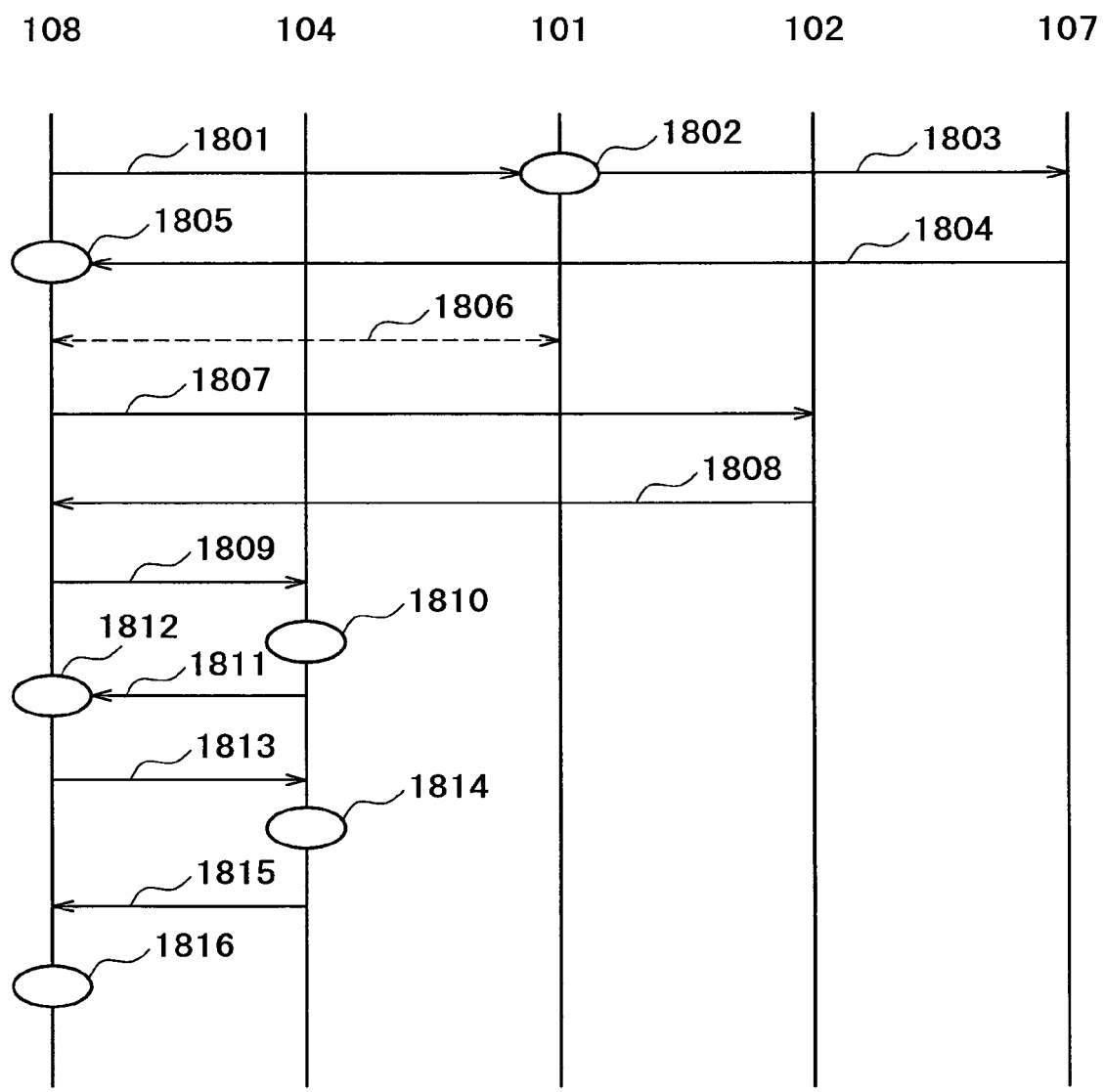
FIG. 18 is an information flow diagram illustrating action of the information image utilization system when contents recorded in an apparatus are streaming-reproduced on a client through an apparatus information image.

FIG. 18 is an information flow diagram illustrating action of the information image utilization system when the user (user ID "U01") of the client 108 performs streaming reproduction of the contents recorded in the information image management server 104 of the apparatus 103 on the client 108 through the apparatus information image (apparatus ID "D99").

As described hereinabove with reference to FIG. 16, the client 108 displays an apparatus information image 1703 and so forth owned by the user on an information image operation part 1701 through a process similar to that at steps 1601 to 1608 (steps 1801 to 1805). If some operation (selection of a menu item, activation of an action or the like) is performed for the apparatus information image 1703, then the client 108 transmits an apparatus ID contained in the apparatus information image to the apparatus management server 102. Then, the client 108 receives a notification of a state of an apparatus indicated by the apparatus information image (steps 1806 to 1808).

The client 108 confirms that the apparatus of an object of operation is in an activated state (power supply ON or the like). Then, if an instruction of "table" (table of contents) is issued from the user of the client 108, then the client 108 accesses the information image management server 104 provided in the apparatus corresponding to the apparatus information image based on position information (location information) of the apparatus 103 (video recorder) contained in the apparatus information image to issue a request for provision of the table of contents (step 1809).

It is to be noted that, if a predetermined operation (left click of the mouse or the like) is performed for the apparatus information image 1703 on the information image operation part 1701, then a rich menu 1704 is displayed. The user would designate an item 1705 "table" on the rich menu 1704 to issue an instruction for provision of the table of contents.

The information image management server 104 refers to the contents information image management table 931 of the contents information image management section 106 to extract a contents information image relating to contents recorded therein (step.1810) and transmits the contents information image to the client 108 (step 1811).

The client 108 displays a contents table window 1706 (FIG. 17) together with a contents information image management part 1707 and so forth (step 1812). If a predetermined operation (left click of the mouse or the like) is performed for the contents information image management part 1707, then the client 108 displays a rich menu 1708. Then, if an item 1709 "play" is selected, then the client 108 issues a request for streaming reproduction of contents data of the contents information image management part 1707 to the information image management server 104 (step 1813).

The information image management server 104 extracts contents data designated by the contents information image management section 106 (step 1814) and transmits the streaming data to the client 108 (step 1815).

After the client 108 receives the streaming data, it displays a reproduction window 1710 and performs reproduction of the contents (streaming reproduction) (step 1816).

Through the process described above, the client 108 issues a handling instruction (streaming reproduction, downloading, deletion or the like) of contents to be recorded by the apparatus indicated by the apparatus information image through the apparatus information image.

It is to be noted that the rich menu 1708 is displayed based on related information contained in the apparatus information image 1703 or the contents information image management 1707. For example, the rich menu 1708 indicates "display" (contents display (the title, reproduction time and so forth) of the contents information image), "download" (downloading of contents data), "play" (streaming reproduction of the contents data), "delete" (deletion of the contents), "introduction (forwarding)" (introduction (forwarding) of an information image and so forth), "assignment" (assignment of the information image and so forth), and so forth.

By utilization of an apparatus information image, apparatus control and apparatus operation such as reproduction, stopping, reservation and so forth can be performed through a network. Further, if an apparatus information image is utilized, then contents downloaded from a site or the like and stored in an audio apparatus or the like at home, contents recorded and so forth can be reproduced by means of a PDA (Personal Digital Assistant) at a place outside the home.

Further, the availability of the items of the rich menu 1708 is determined based on attribute information contained in the apparatus information image 1703 or the contents information image 1707. Although detailed description is hereinafter given, for example, when the apparatus information image 1703 or the contents information image 1707 owned by a user (user ID "U02") contains attribute information of "download inhibited", the item "download" is not displayed on the rich menu 1708 or is displayed by a transmission color or the like. Thus, the user cannot download the contents data of the content information image 1707 from the apparatus.

(5.5. Change of Attribute Information of an Apparatus Information Image)

Subsequently, change of attribute information of an apparatus information image is described.

As described hereinabove, an apparatus information image can play various roles regarding an operation instruction to an apparatus, handling of contents (request for provision, downloading, streaming reproduction, deletion and so forth) and so forth by determining various utilization items (predetermined actions) in related information contained in the apparatus information image. Further, availability (corresponding to the access right) can be set for each utilization item (predetermined action) determined in related information can be set to attribute information contained in an apparatus information image. Further, the setting of availability can be performed for each of apparatus information images and contents information images.

(5.5.1. Action Relating to Change of Attribute Information of an Apparatus Information Image)

Action of the information image utilization system relating to change of attribute information of an apparatus information image is described with reference to FIGS. 19 and 20.

Figure 19:
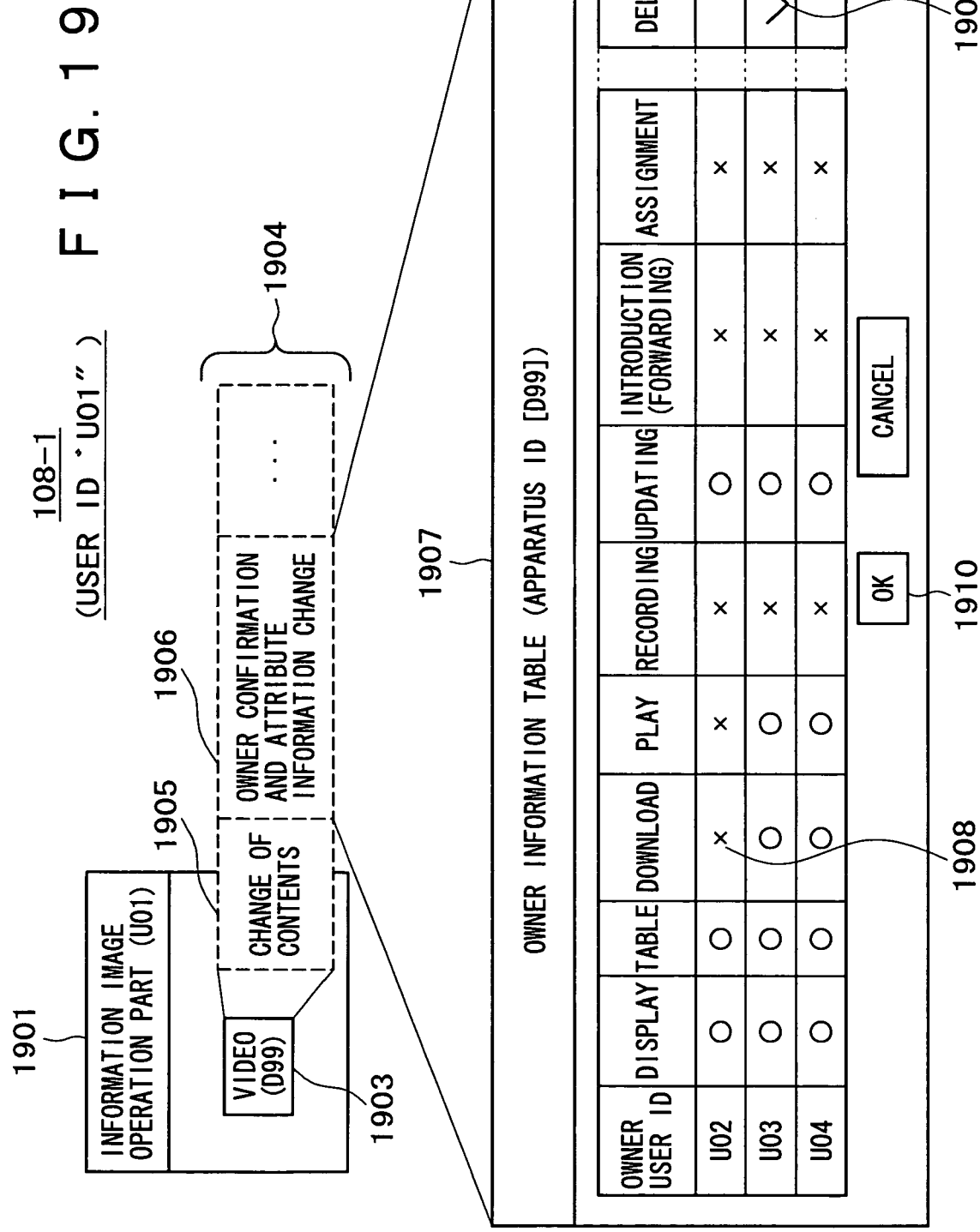
FIG. 19 is a view showing an example of a screen display of owner information of an apparatus information image on a client.

FIG. 19 is a view showing an example of a screen display of owner information of an apparatus information image on a client 108-1.

Figure 20:
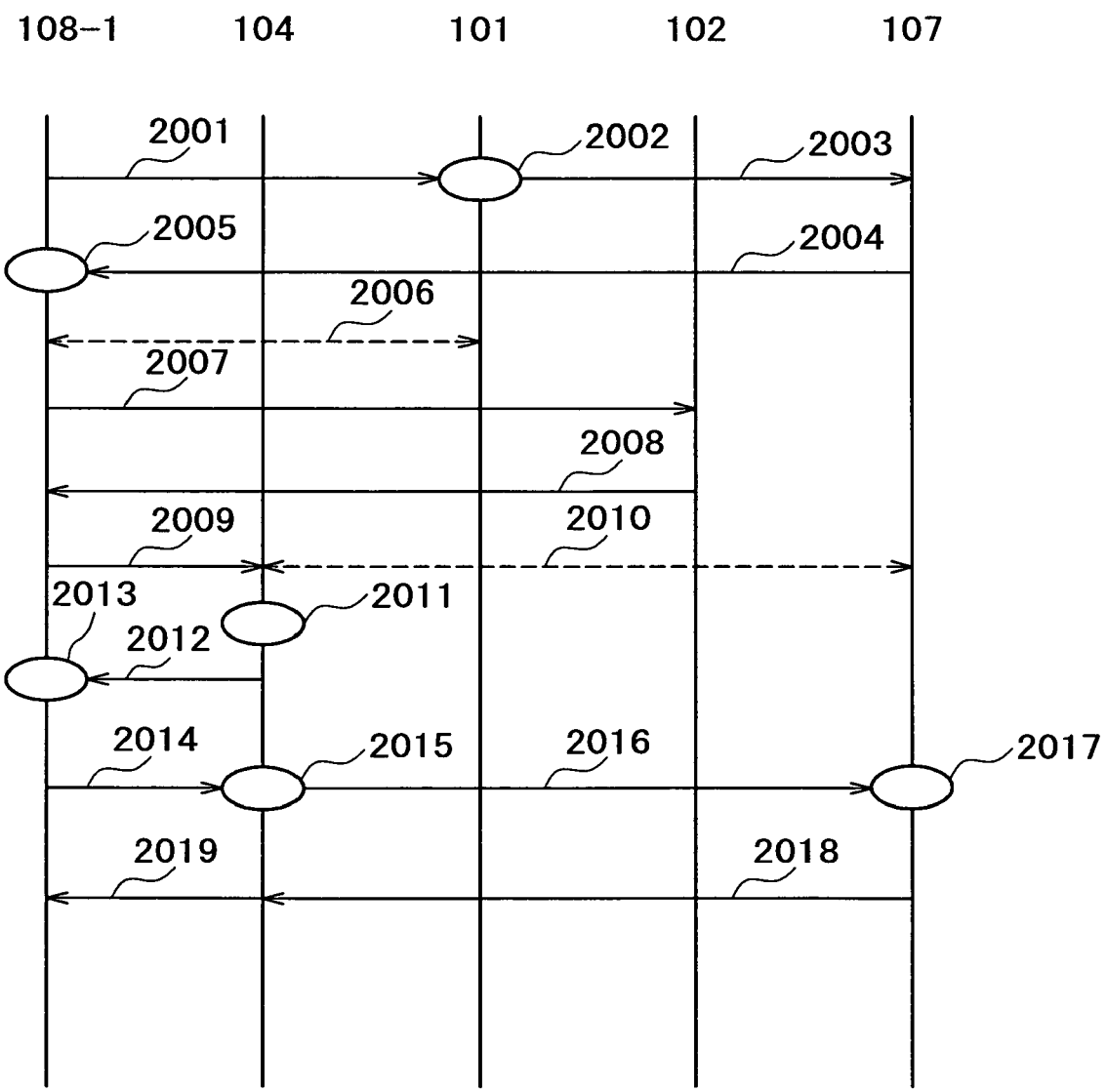
FIG. 20 is an information flow diagram illustrating action of the information image utilization system when attribute information of an apparatus information image is changed.

FIG. 20 is an information flow diagram illustrating action of the information image utilization system when attribute information of an apparatus information image is changed.

In the following, the case that a user 1 (user ID "U01") of the client 108-1 changes attribute information of an apparatus information image (apparatus ID "D99") owned by a user 2 (user ID "U02") is described. It is to be noted that it is assumed that the owner of the apparatus and the provider of the apparatus information image are the user 1 (user ID "U01").

As described hereinabove with reference to FIG. 16, the client 108-1 displays an apparatus information image 1903 and so forth owned by the user 1 on an information image operation part 1901 through processing similar to that at steps 1601 to 1608 (steps 2001 to 2005). If some operation (menu item selection, activation of the action or the like) is performed for the apparatus information image 1903, then the client 108-1 transmits an apparatus ID contained in the apparatus information image to the apparatus management server 102 and receives a notification of a state of the apparatus indicated by the apparatus information image (steps 2006 to 2008).

The client 108-1 confirms that the apparatus of an object of operation is in an activated state (power supply ON or the like). Then, when an item 1906 "owner confirmation and attribute information change" of a rich menu 1904 displayed incidentally on the apparatus information image 1903 is selected, the client 108-1 accesses the information image management server 104 of the apparatus corresponding to the apparatus information image based on position information (location information) of the apparatus 103 contained in the apparatus information image to issue a request for provision of a table of owner information of the apparatus information image (step 2009).

Where contents of the apparatus information image management table 911 and contents of the folder management table 1001 are not in a synchronous state (where, although the owner deletes the apparatus information image or the like, contents of the folder management table are not reflected on the apparatus information image management table), the contents of the tables are synchronized with each other (step 2010).

The information image management server 104 extracts user IDs 916 of the owners of the apparatus information image and attribute information of the copy information image data 920 corresponding to the owners from the apparatus information image management table 911 of the apparatus information image management section 105 to produce owner information table data (step 2011). Then the information image management server 104 transmits the owner information table data to the client 108-1 (step 2012).

The client 108-1 displays such an owner information table window 1907 as shown in FIG. 19 (step 2013).

It is to be noted that the rich menu 1904 is displayed based on related information contained in the apparatus information image 1903 (an information image relating to an apparatus owned by the user 1) owned by the user 1 (user ID "U01"). However, in the rich menu 1904, items different from those of the rich menu displayed incidentally to an apparatus information image (apparatus information image indicating the same apparatus as that of the apparatus information image 1903) owned by another user are displayed. For example, the rich menu 1904 includes such items as an item 1905 "change of contents" and an item 1906 "owner confirmation and attribute information change".

The item 1905 "change of contents" is an item for changing display contents (name of apparatus, type of an apparatus and so forth) on the client of the user who owns the apparatus information image.

The item 1906 "owner confirmation and attribute information change" is an item for confirming the owners of the user information image of the client 108-1 and performing change of attribute information of the user information image and so forth.

The user 1 can refer to the owner information table window 1907 and change the contents of the owner information table window 1907 as the need arises. For example, in order to inhibit "download" through the apparatus information image (apparatus ID "D99") owned by the user 2 (user ID "U02"), the user 1 changes an item 1908 from "○" to "X". On the other hand, in order to inhibit possession of the user 3 (user ID "U03"), that is, in order to delete the apparatus information image (image ID "D99") owned by the user 3, the user 1 places a check mark to an item 1909 "delete". If a button "OK" 1910 is pressed, then the client 108-1 transmits update information (setting information, change information, deletion information or the like) relating to the apparatus information image owned by the different user mentioned above to the information image management server 104 (step 2014).

The information image management server 104 updates contents of the apparatus information image management table 911 (including the copy information image data 920 as well) of the apparatus information image management section 105 based on the update information (setting information, change information, deletion information or the like) transmitted thereto from the client 108-1 (step 2015). Further, the information image management server 104 transmits the updating contents to the folder management server 107 corresponding to the owner of the object of updating (step 2016). The folder management server 107 thus updates the contents of the folder management table 1001 (step 2017).

The folder management server 107 sends a response of completion of the updating to the information image management server 104 (step 2018). The information image management server 104 sends a response of completion of the updating to the client 108-1 (step 2019).

Figure 22:
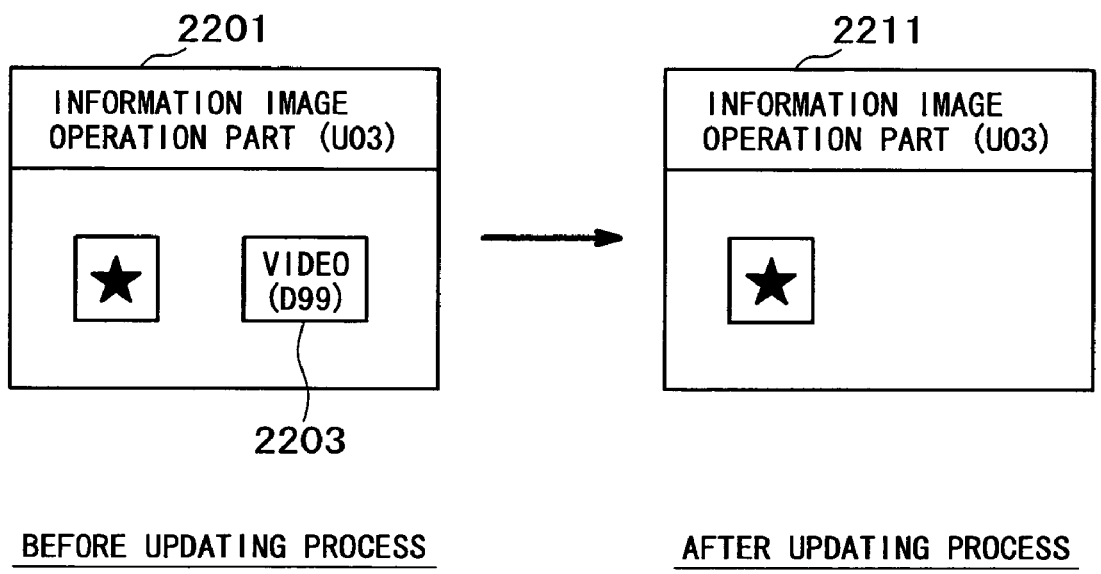
FIG. 22 is a view showing an information image operation section displayed on a client before and after an updating process relating to an apparatus information image.

FIGS. 21 and 22 show the information image operation part displayed on a client before and after the updating process of an apparatus information image described above.

An information image operation part 2101 and a contents table window 2106 are displayed on the client of the operator 2 (user ID "U02") before the updating process. An information image operation part 2111 and a contents table window 2116 are displayed on the client of the operator 2 (user ID "U02") after the updating process.

An information image operation part 2201 is displayed on the client of the operator 3 (user ID "U03") before the updating process, and an information image operation part 2211 is displayed on the client of the operator 3 (user ID "U03") after the updating process.

In the contents table window 2106 before the updating process shown in FIG. 21, an item 2109 "download" of a rich menu 2108 is available. Meanwhile, in the contents table window 2116 after the updating process shown in FIG. 21, an item 2119 "download" of a rich menu 2118 is not available.

In the information image operation part 2201 before the updating process shown in FIG. 22, an apparatus information image 2203 (apparatus ID "D99") is displayed and available. Meanwhile, in the information image operation part 2211 after the updating process shown in FIG. 22, the apparatus information image is not displayed any more and is not available.

(5.5.2. Effects of Change of Attribute Information)

As described above, a provider of an apparatus information image (user who owns the apparatus) can change attribute information relating to an apparatus information image (copy information image) indicating the apparatus owned by a different user. Further, the provider can change attribute information relating to a contents information image (copy information image) indicating contents data in the apparatus similarly as in the case of an apparatus information image. Consequently, a provider of an apparatus information image can cope with a case wherein the apparatus information image becomes owned by an unintended user through duplication or from some other reason or when the provider wants to restrict utilization of the apparatus information image by some owner by changing attribute information of the apparatus information image corresponding to the owner or by deleting the apparatus information image corresponding to the owner. In particular, the provider not only can restrict utilization of an apparatus information image in advance but also can cope with an ex post facto reason such as an illegal operation of an apparatus or illegal acquisition of contents data in an apparatus through the apparatus information image. In other words, through intervention of an apparatus information image, not only it becomes possible to access an apparatus from a client but also it is possible to perform authentication of the client. Consequently, illegal accessing to an apparatus and so forth can be prevented and information circulation having a high degree of safety can be achieved.

(6. Other Modifications and so Forth)

While a preferred embodiment of an information image utilization system and so forth according to the present invention has been described referring to the accompanying drawings, the present invention is not limited to the specific embodiment. It is apparent that various changes and modifications may be made by those skilled in the art within the spirit and scope of the technical ideal disclosed by the present invention, and it is recognized that also those changes and modifications naturally fall within the technical scope of the present invention.

In the information image utilization system according to the present invention, a provider of an apparatus information image (a user who possesses a pertaining apparatus) can grasp owners of the apparatus information image. While the apparatus information image holds various utilization items (predetermined actions) in related information contained therein, the access right can be set in attribute information contained in the apparatus information image for each owner and for each utilization item (predetermined action). In particular, based on the access right, authentication relating to utilization of the apparatus information image can be performed for each owner and for each utilization item (predetermined action). Further, since an information image management server stores such related information, attribute information, owner information and so forth as mentioned above, the owners of the apparatus information image can be grasped at any point of time, and the access right relating to utilization of the apparatus information image can be set particularly.

It is to be noted that, while a user management server, an apparatus management server and a folder management server are formed as hardware of separate bodies from one another, depending upon the configuration of the system, they may otherwise be combined in an arbitrary combination to form them as common hardware.

Further, while an information image management server and a client are formed as hardware of separate bodies from one another, depending upon the configuration of the system, they may otherwise be formed as hardware of a single body. In other words, an apparatus in the present information image utilization system may include an information image management server and a client.

The user management server 101 stores the apparatus management server position 705 and the folder management server position 706 for each user by means of the user management table 701. Accordingly, the apparatus management server and the folder management server need not necessarily be managed in a centralized manner, and a plurality of such servers may be provided in a decentralized manner. It is to be noted that position information (locations) of them may be contained in an information image.

It is to be noted that, since an information image is registered in a folder for exclusive use for each of users (each of operators) on a folder management server, it is not necessary to register it in a particular client. In other words, each user (operator) can access the information image utilization system through any client to utilize an information image owned in the folder thereof. Further, illegal duplication or the like of the information image can be excluded. Where the information image is an apparatus information image, illegal operation for the apparatus and illegal acquisition of contents in the apparatus can be excluded. If the client does not include a supporting program or the like relating to utilization of other information images such as an information image operation part, then when the client accesses the information image utilization system, the support program or the like may be downloaded from the user management server, information image management server or the like.

Where a contents information image can be owned by a user (can be registered into a folder management server), once the user owns the contents information image, the user can access the contents data without the intervention of an apparatus information image. However, from the point of view of the safety of contents data stored in an apparatus (information image management server) and so forth, it is possible to determine that a contents information image cannot be owned by a user (cannot be registered into a folder management server) and allow the user to access the contents data only through an apparatus information image. In other words, an apparatus information image can play a roll of an authentication function not only with regard to utilization of an apparatus but also with regard to utilization of contents data the apparatus has.

Contents of data stored in the information image management server 104 (apparatus information image management table 911 and contents information image management table 931) and contents of data stored in the folder management server 107 (folder management table 1001) are synchronized with each other at a predetermined timing so that the consistency is maintained.

When an information image (apparatus information image or the like) is to be provided (issued, forwarded or the like) to a folder (folder management section), it is possible to contain information corresponding to a public key or the like into attribute information or the like of an information image (apparatus information image or the like) to be provided (issued, forwarded or the like) such that the information image (apparatus information image or the like) may be present only in a folder of the user in a destination of provision (destination of issuance, destination of forwarding or the like) (may not be introduced (forwarded) and may not be assigned).

In addition to a public key, information relating to authentication wherein a public key encryption system is used such as, for example, an electronic certificate (electronic signature), information relating to a third party organization (authentication office) in which public keys are stored, and so forth may be contained in attribute information or the like of an information image (apparatus information image or the like). In this instance, falsification, eavesdropping or the like of an information image (apparatus information image or the like) upon provision, introduction (forwarding), assignment or the like can be prevented. Further, it becomes possible to enhance the safety in operation of an apparatus and handling of contents through an apparatus information image.

On the other hand, while a copy information image has a serial ID as specific information, where an information image is off-lined (duplicated onto a recording medium or the like) or in the like case, when the copy information image is registered into a folder and owned, a serial ID is applied to the copy information image from the information image management server. Consequently, even if a copy information image is duplicated or the like without the intervention of the information image utilization system, it is possible to exclude illegal utilization of the information image and to grasp the owner at all times.

Further, the related information contained in an apparatus information image may be information that indicates a presence situation of the pertaining apparatus (activated situation, location information, utilization client information and so forth).

The functions of the servers and the clients (including the information terminal equipment and so forth) implemented in the embodiment described above can be achieved all by software or a computer program. Therefore, the necessary software or computer program can be circulated through a network or through a recording medium such as a CD-ROM or a DVD-ROM on which the program is recorded.

As described above, according to the present invention, an information image utilization system and so forth can be provided by which, in an information image (apparatus information image) which specifies the position of an apparatus and allows an operation of the apparatus through a network, acquisition of information from the apparatus and so forth, utilization of the apparatus information image, the access right relating to an operation of the apparatus, acquisition of information and so forth through the apparatus information image, utilization restriction and so forth can be set particularly to authenticate.

The invention claimed is:

1. An information image utilization system for performing multimedia file management, the system comprising:
   a multimedia apparatus;
   a plurality of clients;
   an information image management server comprising an apparatus portion for:
      producing and storing a master apparatus information image, the master apparatus information image comprising specific information including a multimedia apparatus identifier, and related information that the clients can use to perform predetermined actions; and
      producing and storing a copy apparatus information image by copying at least part of the master image and adding attribute information not included in the master image, the attribute information describing access rights for each client that has ownership of the copy image and access rights for performing the predetermined actions in the related information;
   wherein a first client includes means for:
      receiving the copy image upon authentication;
      displaying the copy image as an icon;
      displaying a menu upon selection of the copy image, wherein the menu is based on the related information in the copy image;
      transmitting, to an apparatus management server, a request for notification of a state of the multimedia apparatus upon selection of the menu by a user;
      receiving a notification of the state of the multimedia apparatus from the apparatus management server; and
      performing at least one of the predetermined actions upon receiving the notification, wherein the at least one predetermined action comprises accessing the multimedia apparatus using the multimedia apparatus identifier in the copy image, and causing the multimedia apparatus to perform a multimedia task.

2. The system of claim 1 wherein the information image management server further comprises a content portion for acquiring content in accordance with an instruction from one of the clients, and producing and storing a content information image.

3. The system of claim 2 further comprising a folder management server for storing a folder management table which coordinates client identifiers with identifiers of the copy images owned by the clients and with identifiers of master images related to the clients.

4. The system of claim 3 further comprising a user management server for authenticating the clients by referring to a user management table that coordinates the clients identifiers with folder management servers that the clients may access.

5. The system of claim 4 wherein the clients access the folder management servers after authentication, display the copy image owned by the client, and perform the predetermined action based on the attribute information contained in the copy image.

6. The system of claim 1 wherein the predetermined action includes at least one of: operation of the apparatus, acquisition of contents possessed by the apparatus, reproduction of the contents, and deletion of the contents.

7. The system of claim 1 wherein the information image comprises XML data.

8. The system of claim 1 wherein when an owner of the copy image changes, the information image management server has:
means for causing the change to be reflected on the apparatus information image management table;
means for extracting an identifier of the client which owns the copy image based on the apparatus information image management table.

9. The system of claim 1 wherein when an attribute instruction is received to change the attribute information in the copy image or to delete the copy image, the apparatus information image management table is updated based on the attribute instruction.

10. A recording medium on which a program which causes a computer to function as an information image management server according to claim 1 is recorded.

11. A method for performing multimedia file management, the method comprising:
producing and storing a master apparatus information image, the master apparatus information image comprising specific information including a multimedia apparatus identifier, and related information that a plurality of clients can use to perform predetermined actions;
producing and storing a copy apparatus information image by copying at least part of the master image and adding attribute information not included in the master image, the attribute information describing access rights for each client that has ownership of the copy image and access rights for performing the predetermined actions in the related information;
sending the copy image to a client upon authentication;
displaying a menu upon selection of the copy image, wherein the menu is based on the related information in the copy image;
transmitting a request for notification of a state of a multimedia apparatus upon selection of the menu by a user;
receiving a notification of the state of the multimedia apparatus; and
performing at least one of the predetermined actions upon receiving the notification, wherein the at least one predetermined action comprises accessing the multimedia apparatus using the multimedia apparatus identifier in the copy image, and causing the multimedia apparatus to perform a multimedia task.

12. The method of claim 11, further comprising:
acquiring content in accordance with an instruction from one of the clients, and producing and storing a content information image.

13. The method of claim 12 further comprising:
storing a folder management table which coordinates client identifiers with identifiers of the copy images owned by the clients and with identifiers of master images related to the clients.

14. The method of claim 13 further comprising:
authenticating the clients by referring to a user management table that coordinates the clients identifiers with folder management servers that the clients may access.

15. The method of claim 14 wherein the clients perform the steps of:
accessing the folder management servers after authentication;
displaying the copy image owned by the client; and
performing the predetermined action based on the attribute information contained in the copy image.

16. The method of claim 11 wherein the predetermined action includes at least one of:
operation of an apparatus;
acquisition of contents possessed by the apparatus;
reproduction of the contents; and
deletion of the contents.

17. The method of claim 11 wherein the information image comprises XML data.

18. The method of claim 11, wherein when there is a change of ownership of the copy image, the method performs the steps of:
causing the change to be reflected on the apparatus information image management table; and
extracting an identifier of the client which owns the copy image based on the apparatus information image management table.

19. The method of claim 11 further comprising:
updating the apparatus information image management table based on an attribute instruction when the attribute instruction is received to change the attribute information in the copy image or to delete the copy image.

20. A computer-readable medium storing program instructions, which, when executed by a processor, cause the processor to perform a method for multimedia file management, the method comprising:
producing and storing a master apparatus information image, the master apparatus information image comprising specific information including a multimedia apparatus identifier, and related information that a plurality of clients can use to perform predetermined actions;
producing and storing a copy apparatus information image by copying at least part of the master image and adding attribute information not included in the master image, the attribute information describing access rights for each client that has ownership of the copy image and access rights for performing the predetermined actions in the related information;
sending the copy image to a client upon authentication;
displaying a menu upon selection of the copy image, wherein the menu is based on the related information in the copy image;
transmitting a request for notification of a state of a multimedia apparatus upon selection of the menu by a user;
receiving a notification of the state of the multimedia apparatus; and
performing at least one of the predetermined actions upon receiving the notification, wherein the at least one predetermined action comprises accessing the multimedia apparatus using the multimedia apparatus identifier in the copy image, and causing the multimedia apparatus to perform a multimedia task.

* * * * *